United States Patent
Gabbard et al.

(10) Patent No.: US 6,205,432 B1
(45) Date of Patent: Mar. 20, 2001

(54) BACKGROUND ADVERTISING SYSTEM

(75) Inventors: Chuck E. Gabbard, Southport, NC (US); Bruce R. Chaffins, Knoxville, TN (US); Everett B. Howerton, III, Roswell, GA (US)

(73) Assignee: Creative Internet Concepts, LLC, South Port, NC (US)

(*) Notice: Subject to any disclaimer, the term of this patent is extended or adjusted under 35 U.S.C. 154(b) by 0 days.

(21) Appl. No.: 09/193,459

(22) Filed: Nov. 16, 1998

Related U.S. Application Data

(60) Provisional application No. 60/088,149, filed on Jun. 5, 1998.

(51) Int. Cl.[7] .................................................. G06F 17/60
(52) U.S. Cl. ................... 705/14; 705/1; 707/513
(58) Field of Search ............. 705/1, 14; 707/65, 707/513; 709/204, 206, 217, 218, 219

(56) References Cited

U.S. PATENT DOCUMENTS

| | | | |
|---|---|---|---|
| 4,850,007 | * 7/1989 | Marino et al. | 379/88.2 |
| 4,994,985 | 2/1991 | Cree et al. | 709/206 |
| 5,276,869 | 1/1994 | Forrest et al. | 709/206 |
| 5,283,887 | 2/1994 | Zachery | 707/513 |
| 5,333,186 | * 7/1994 | Gupta | 379/201 |

(List continued on next page.)

FOREIGN PATENT DOCUMENTS

| | | | |
|---|---|---|---|
| 9-50441 | * 2/1997 | (JP) . | |
| 9-259189 | * 10/1997 | (JP) . | |
| WO 96/24213 | 8/1996 | (WO) | H04L/29/06 |

OTHER PUBLICATIONS

Lois–Bujold Digest 1085, http://ftp.herald.co.uk/pub/lists/bujold–archives/9801010–1085, Jan. 1, 1998.*

(List continued on next page.)

Primary Examiner—James P. Trammell
Assistant Examiner—Nicholas David Rosen
(74) Attorney, Agent, or Firm—Thomas, Kayden, Horstemeyer & Risley LLP

(57) ABSTRACT

An advertisement system and method are provided for inserting into an end user communication message a background reference to an advertisement. In some embodiments, the background reference causes an advertisement image to be tiled, or watermarked, across an end user screen behind the text of an e-mail message or public posting. A message server inserts the background reference after receiving a message originally sent from an end user originator and before sending the message to be delivered to an end user recipient. When necessary, the message server will convert at least a portion of the message into a proper format, such as HTML, before inserting the background reference to an advertisement, which is preferably selected in accordance with end user recipient demographic information and/or ad exposure statistics. The advertisement itself, often a graphical file, is preferably not transmitted with the message, but is typically stored at the message server or other location remote from the end user recipient. Preferably, the message server maintains and refer to records on each end user recipient to allow for selective enablement of background reference insertion and overwriting based upon end user preferences. According to various "non-web" example embodiments, the message server transmits an SMTP, POP3 or NNTP message with an HTML portion for a respective HTML-compatible client. In other "web-based" example embodiments, the message server transmits the entire message in HTML to be used as a stand-alone web page or as a portion of a larger page employing frames or tables.

46 Claims, 14 Drawing Sheets

U.S. PATENT DOCUMENTS

| | | | |
|---|---|---|---|
| 5,418,908 | 5/1995 | Keller et al. ........................... | 709/206 |
| 5,515,098 | 5/1996 | Carles . | |
| 5,530,852 | 6/1996 | Meske, Jr. et al. ................... | 709/206 |
| 5,557,721 | 9/1996 | Fite et al. ............................... | 705/14 |
| 5,572,643 | 11/1996 | Judson ................................. | 709/218 |
| 5,619,648 | 4/1997 | Canale et al. ......................... | 709/206 |
| 5,627,997 | 5/1997 | Pearson et al. ........................ | 710/65 |
| 5,643,088 * | 7/1997 | Vaughn et al. ......................... | 463/40 |
| 5,654,886 | 8/1997 | Zereski, Jr. et al. ..................... | 702/3 |
| 5,675,507 * | 10/1997 | Bobo, II ................................ | 709/206 |
| 5,706,434 | 1/1998 | Kremen et al. ....................... | 709/218 |
| 5,708,960 | 1/1998 | Kamisaka et al. .................... | 455/3.2 |
| 5,724,424 | 3/1998 | Gifford .................................. | 705/79 |
| 5,740,549 | 4/1998 | Reilly et al. ........................... | 705/14 |
| 5,761,673 | 6/1998 | Bookman et al. .................... | 707/104 |
| 5,778,372 * | 7/1998 | Cordell et al. ........................ | 707/100 |
| 5,781,894 | 7/1998 | Petrecca et al. ....................... | 705/14 |
| 5,781,901 * | 7/1998 | Kuzma .................................. | 707/10 |
| 5,790,793 | 8/1998 | Higley .................................. | 709/218 |
| 5,794,210 | 8/1998 | Goldhaber et al. ................... | 705/14 |
| 5,809,242 | 9/1998 | Shaw et al. ........................... | 709/217 |
| 5,913,040 | 6/1999 | Rakavy et al. ....................... | 709/232 |
| 5,935,228 * | 8/1999 | Shinomura ........................... | 710/102 |
| 5,973,683 * | 10/1999 | Cragun et al. ....................... | 345/327 |
| 5,974,451 * | 10/1999 | Simmons ............................. | 709/218 |
| 6,009,409 * | 11/1999 | Adler et al. ............................ | 705/14 |
| 6,065,024 * | 5/2000 | Renshaw .............................. | 707/513 |

OTHER PUBLICATIONS

Ruddy, Link–Up, vol. 12, No. 4, p. 33, "HTML explained for dummies—An attendee of the WWW '95 conference tells all," Jul. 1, 1995.*

Lyon, PC/Computing, vol. 9, No. 4, p. 161, "Free electronic network", Apr. 1, 1996.*

John P.Stones, "Do You: Have a Free Web–Based Email?"http://www.what–next.com/doyou _email.html, Web Currents(TM), 1999, pp. 1–4, see p. 1.

Earl Hood, "MhonArc: An Email–to–HTML Converter, "http://www.oac.uci.edu/indiv/ehood/mhonarc.html, Feb. 19, 2000, pp. 1–4, see p.1.

Earl Hood, "Change History for MHonArc, "http://www.oac.uci.edu/indiv/ehood/MhonArc/Changes, Feb. 14, 2000, pp. 1–29, see p. 29.

Dave Taylor; Creating Cool Web Pages With HTML 2nd Edition; 1995; pp. 164–167.

Rita Lewis; Create Web Pages Without Learning HTML; 1996; pp. 187–194.

www.what–next.com/doyou_email.html; Our Top 10 Free web–based email services; Mar. 15, 2000.

Printout from Inbox of Microsoft Outlook; Options for Mail Format.

Printout from Hotmail Tip, Use Stationary to Send Fun, Colorful Messages.

Kohda Youji, Susumu Endo; "Ubiquitous advertising on the WWW: Merging advertising on the browser" Computer Networks and ISDN Systems; Elsevier Science, 1996, pp. 1493–1499.

Gus Venditto, "A Message from E–Mail Publishers," May 11, 1998, pp. 1–3.

Elizabeth Gardner, "Big Advertiser Plans Summit to Discuss Web Plans," May 11, 1998, pp. 1–2.

"IAB Advertising Effectiveness Study Executive Summary," Mbinteractive, 1997, pp. 1–6.

D. Williamson, "This e–mail message is brought to you by . . . ," Advertising Age, Apr. 17, 1995, p. 1.

"The Internet Advertising Discussion List," May 11, 1998, pp. 1–17.

"The Internet Advertising Discussion List," May 23, 1998, pp. 1–7.

Penelope Patsuris, "Banner years: A brief history of web advertising," p. 1.

Paul Festa, "Patent could push firms' buttons," CNET, Aug. 21, 1998, pp. 1–4.

"Accipiter, AdManager 2.0," Product Overview, pp. 1–4, http:\\www.accipiter.com\products\ADManager\admgrov.

"How PointCast Works," pp. 1–4, http:\\www.pointcast.com\products\pcn\hwork.html?pcnidx.

"eMarketer Tallies the Number of e–Mail Messages Sent in 1998," pp. 1–2, http:\\www.emarketer.com\estats\020199_email.html.

"Net Geography," pp. 1–7, http:\\www.emarketer.com\estats\net_geography_ex-p.html.

"Net Market Size and Growth: e–Mail," p.1, http:\\www.emarketer.com\estats\nmsg_email.htm.

"eCommerce: Top Spending Categories," pp. 1–3, http:\\www.emarketer.com\estats\ec_proj.html.

"eTrends: Trend Two," pp. 1–2, http:\\www.emarketer.com\estats\et2.html.

"eTrends: Trend 4," p. 1, http:\\www.emarketer.com\estats\et4.html.

Paul Bruemmer, "Advertising Models, Cool New Ad Vehicles That Work," pp. 1–5, http:\\www.searchz.com\Articles\0215991.shtml.

Jim Houck, "Brand Advertising on the Internet: Dead or Alive?" pp. 1–4, http:\\www.searchz.com\clickz\121897.shtml.

"IAB Releases 3Q 1998 Web Ad Spending Results," pp. 1–2, http:\\www.emarketer.com\estats\021699_iab.html.

"eMarketer's Top 10 Predictions for the Internet in 1999," pp. 1–5, http:\\www.emarketer.com\estats\122198_top1999.html.

http:\\www.searchz.com\search\search.cgi?cat=Advertising:Articles, columns_and_reviews:Branding:, pp. 1–8.

Keith Pieper, "Affiliate Networks: The more the Internet Changes business, the more business stays the same," ClickZ Network, Nov. 22, 1997, pp. 1–4.

Jim Houck, "Brand Advertising on the Internet: Dead or Alive?" ClickZ Network, Dec. 18, 1997, pp. 1–4.

Keith Pieper, "Brand Preference: The Final Frontier in Online Competition," ClickZ Network, Mar. 30, 1998, pp. 1–4.

Rob Frankel, "Branding at the Frankel Corral: The Best Thing You'll Ever Do For Your Product," ClickZ Network, Feb. 4, 1998, pp. 1–4.

Janet Ryan, "Branding Really is Powerful on the 'Net," ClickZ Network, Jul. 6, 1998, pp. 1–3.

Gerry McGovern, "Building Brand: Brick by Brick," ClickZ Network, Apr. 28, 1998, pp. 1–4.

Jim Houck, "Classic Battle Strategy Revisited: The Marketing General Evaluates the Search Engines," ClickZ Network, Mar. 30, 1998, pp. 1–5.

Keith Pieper, "Clickthrough vs Branding: Aiming For The Long Term With Branding," ClickZ Network, May 8, 1997, pp. 1–4.

Kim Brooks, "Germ Warfare: How to Spawn A Marketing Virus," ClickZ Network, Oct. 26, 1998, pp. 1–4.

Bobbie Halfin, "Dialing for Ad Dollars," ClickZ Network, Oct. 30, 1998, pp. 1–4.

Guy Bourgeois, "Building Notoriety on the 'Net," ClickZ Network, Sep. 11, 1998, pp. 1–4.
Leo Sheiner, "Branding on The Net: A Brave New World," ClickZ Network, Sep. 11, 1998, pp. 1–4.
Leo Sheiner, "Do You Offer A Rich Experience?" ClickZ Network, Sep. 22, 1998, pp. 1–4.
Gerry McGovern, "New Packaging For A New Age," ClickZ Network, Sep. 24, 1998, pp. 1–4.
Sean Carton, "Building Your Brand . . . One Hero At A Time," ClickZ Network, Sep. 30, 1998, pp. 1–4.
Tom Hespos, "How Not To Build A Community," ClickZ Network, Nov. 17, 1998, pp. 1–3.
Rob McEwen, "The Little Things That Make A Difference," ClickZ Network, Dec. 10, 1998, pp. 1–3.
Bobbie Halfin, Feb. 5, 1999, "A Roadmap To Site Branding Strategy," ClickZ Network, pp. 1–4.
Patricia Riedman, "Cyber Brands Spread The Word With Offline Ads," Advertising Age, Jul. 7, 1998, pp. 1–3.
Suzan Nolan, "Does Anyone Have An International Game Plan?" ClickZ Network, Jun. 17, 1998, pp. 1–4.
Rob Frankel, "Doing That Voodoo That You Do So Well," Jun. 1998, pp. 1–3.
Tom Hespos, "Is Rich Media That Gateway to Branding on The 'Net?" WhosMarketingOnline, Jun. 2, 1998, (ClickZ Network, "Commerce. Counting the Cost of Banner Ads," pp. 1–3).
Andy Bourland, "Microscope: The Expression of ClickZ's Approach to Advertising And Sponsorship," ClickZ Network, Jan. 26, 1998, pp. 1–5.
Jim Houck, "ROI Part III: Know Your Variables," ClickZ Network, Mar. 9, 1998, pp. 1–4.
Theresa Howard, "Technology To Help Join Direct And Brand Marketing," Direct Marketing News, Jun. 12, 1998, (DM News Search, pp. 1–3).
Riggs Eckelberry, "The 'Whole Internet' Marketing Strategy," ClickZ Network, Jun. 16, 1998, pp. 1–4.
Tom Hespos, "The Blurred Line Between Advertising And Content," ClickZ Network, Jun. 16, 1998, pp. 1–3.
Steve Markowitz, "The Case for Private Branding," ClickZ Network, pp. 1–5.
Michael Hess, "The New Year Will Bring Challenges, Rewards In Online Advertising," ClickZ Network, Jan. 12, 1998, pp. 1–5.
Jim Houck, "The Next Chapter in Web Advertising: ROI," ClickZ Network, Mar. 2, 1998, pp. 1–3.
Suzan Nolan, "The Potential For Online Advertising—In Europe, Or Maybe Yourtown, USA," ClickZ Network, Nov. 4, 1997, pp. 1–4.
Ken Glaser, "Today's Recipe: All The Right Ingredients for Web Success," ClickZ Network, Sep. 23, 1997, pp. 1–4.
Jim Houck, "What's A Media Minute Worth?" Click Z Network, Apr. 13, 1998, pp. 1–3.
Riggs Eckelberry, "Whole Internet Marketing (Part 1)," ClickZ Network, Jun. 9, 1998, pp. 1–4.
Tom Hespos, "Dabbling Before You Jump," ClickZ Network, Aug. 4, 1998, pp. 1–3.
http:\\www.searchz.com\search\search.cgi?cat=Advertising:Articles, columns_and_reviews:Pricing_models:, pp. 1–6.
James Houck, "Advertising Without Seduction: Web Ad Firms Lay It All On The Line," ClickZ Network, Jul. 17, 1997, pp. 1–4.

Rick E. Bruner, "Affiliate Sales: Direct Marketer's Heaven, Publisher's Purgatory," Executive Summary, Jun. 2, 1998, pp. 1–4.
Keith Pieper, "Maximize Your Revenue Per Eyeball," ClickZ Network, Oct. 1, 1998, pp. 1–4.
Jeffrey Brewer, "Pay–For–Performance: Creating More And Better Value," ClickZ Network, Aug. 18, 1998, pp. 1–5.
Jay Schwedelson, "The Main Event: Cost Per Click Vs. Cost per Impression," ClickZ Network, Sep. 25, 1998, pp. 1–3.
Sean Carton, "Why Does Pay for Performance Suck?" ClickZ Network, Nov. 18, 1998, pp. 1–4.
James L Marciano, "The Golden Rules for the CPM Model," ClickZ Network, Dec. 3, 1998, pp. 1–5.
Larry Braitman, "The Real–Time Ad Market," ClickZ Network, Aug. 7, 1998, pp. 1–4.
Mark Grimes, "CPO: New Media Equals A New Yardstick For Media Buying," ClickZ Network, May 1, 1997, pp. 1–4.
Chris Bertchie, "Decisions, Decisions: Pricing Strategies For Web Site Publishers," ClickZ Network, Nov. 25, 1997, pp. 1–4.
Steve Madere, "Deja's Views: Testing Is Key to Performance–Based Pricing," ClickZ Network, Sep. 2, 1997, pp. 1–4.
Andy Bourland, "Direct Marketing On The Net: Trailer Park Trash or Trump Tower?" ClickZ Network, Jul. 11, 1997, pp. 1–4.
Jamie Byrne, "DoubleClick Direct: No Double Talk From DoubleClick," ClickZ Network, Jul. 15, 1997, pp. 1–4.
Robert Grosshander, "Eyegive, Yougive: A New Model for Advertising Dollars," ClickZ Network, Oct. 3, 1997, pp. 1–3.
Andy Bourland, "Biz 101: Getting The Lowest Price When You Buy, Getting the Highest Price When You Sell," ClickZ Network, May 23, 1997, pp. 1–4.
Debbie A. Everson, "Going Commercial: 10 Steps to Prepare Your Site to Sell Advertising And Sponsorships," ClickZ Network, Jun. 9, 1997, pp. 1–7.
Steven Vonder Haar, "It's Not Banner Time for Web Advertising," Inter@ctive Week, Jun. 15, 1998, pp. 1–5.
Michael Hess, "No Question Is A Bad Question . . . Or Is It?" ClickZ Network, Apr. 7, 1998, pp. 1–3.
Dr. William Busa, "Out With The Old, In With The Odd," Feb. 24, 1998, ClickZ Network, pp. 1–4.
Keith Pieper, "Pay for Performance: All Responses Are Not Created Equal," ClickZ Network, Oct. 18, 1997, pp. 1–3.
Rob Frankel, "Performance Based Pricing Models: Double Click or Double Talk?" ClickZ Network, Jul. 9, 1997, pp. 1–3.
Andy Bourland, "Site Publishers: Take the Direct Response Bull by The Horns," ClickZ Network, Sep. 26, 1997, pp. 1–3.
Keith Pieper, "So You're Thinkin' About Going Direct? It's Still the Impression Business," ClickZ Network, Oct. 11, 1997, pp. 1–4.
Jim Houck, "The Interactive Media Budget: How High Is Up?" ClickZ Network, Feb. 23, 1998, pp. 1–4.
Adam J. Boettiger, "The Pay–Per–Sale Advertising Model: A Media Buyer's Dream . . . Or A Web Site Owner's Nightmare?" ClickZ Network, Oct. 10, 1997, pp. 1–6.
Scott Cherkin, "Thinking It Through: Calculating the Risks of Performance Based Pricing," ClickZ Network, Sep. 19, 1997, pp. 1–4.
Jesse Berst, "Web Advertising Woes (And How to Survive Them)," ZDNet, Jun. 16, 1998, pp. 1–3.

Keith Pieper, "What's With You? The Top Internet Marketing Peeves!" ClickZ Network, Jul. 2, 1998, pp. 1–6.

"NetCreations Releases TrackBot Response Management System," BizReport.com, Mar. 1, 1999, pp. 1–2, http:\\www.bizreport.com\news\1999\03\990301–2.htm.

David Pogue, "Reviews," Macworld, Apr., 1990, pp. 168–172.

David Taylor, "In–context Advertising in the Next Wave," Marketing Computers, v16, nl, p28, Jan., 1996, pp. 1–2.

"Web Software Keeps Ad Message On Every Screen," Media Daily, Mar. 8, 1996, p. 1.

"Web Advertising Comes of Age With SNOW; SNOW Positions Brand Names On Every Home Page," Business Wire, Mar. 8, 1996, p. 1.

Victoria Griffith, "Media Futures: A Hard Sell Down the Line—Advertising is Finding its Feet in Cyberspace," Financial Times, Mar. 6, 1995, pp. 1–2.

AOL Instant Messenger, pp. 1–3, http://www.aol.com/aim/home.html.

Mirabilis Ltd.—How to Use ICQ, pp. 1–8, http://www.ICQ.com/icqtour/new–quicktour–html.

Go Fishin.Com—Discount Gear and Tackle, http://www.gofishin.com.

Bill Pearce—Serving You For Over 25 Years—Locally Owned and Operated, http://www.billpearce.com.

Ad Resource, pp. 1–31, http://www.sisoftware.com/html/beyond_the_banner_advertising.html.

* cited by examiner

From: "Sender" <sender@tkhr.com>
To: "Recipient" <recipient@tkhr.com>
Subject: Test
Date: Tue, 2 Jun 1998 19:07:10 -0400

This is the email message!

FIG. 6

```
<html>
<br><br><br><br><br><br>
<h1> Read Message </h1>
<h2>In-Box</h2>
From: "sender" <sender@tkhr.com><br>
To: "recipient" <recipient@tkhr.com><br>
Subject: Test<br>
Date: Tue, 2 Jun 1998 19:07:10 -0400<br><br>

This is the email message!<br>
<br><br>
</html>
```

FIG. 7

```
<html>
<body background="http://www.exampledomain.com/tkhr_ad.jpg">
<br><br><br><br><br><br>
<h1> Read Message </h1>
<h2>In-Box</h2>
From: "sender" <sender@tkhr.com><br>
To: "recipient" <recipient@tkhr.com><br>
Subject: Test<br>
Date: Tue, 2 Jun 1998 19:07:10 -0400<br><br>
        This is the email message!<br>
<br><br>
</html>
```

From: "Sender" <sender@tkhr.com>
To: "Recipient" <recipient@tkhr.com>
Subject: Test
Date: Tue, 2 Jun 1998 19:07:10 -0400

This is the email message!

begin 666 Clouds.bmp
M_____<`?_____
M_____]P!_
M_____
M_____W"'_____
M_____<`
M?_____
M_____]P!_____
M_____W
M"'_____
M_____<`=W=W=W=W=W=W=W=W=W
M=W=W=W=W=W=W=W=W=W=W=W==W="=P"`
end

From: "Sender" <sender@tkhr.com>
To: "Recipient" <recipient@tkhr.com>
Subject: Test
Date: Tue, 2 Jun 1998 20:09:30 -0400
MIME-Version: 1.0
Content-Type: multipart/mixed;
    boundary="----=_NextPart_000_008B_01BD8E64.C7C0B150"
This is a multi-part message in MIME format.
------=_NextPart_000_008B_01BD8E64.C7C0B150
Content-Type: text/plain;
    charset="iso-8859-1"
Content-Transfer-Encoding: 7bit This is the email message!

------=_NextPart_000_008B_01BD8E64.C7C0B150
Content-Type: image/bmp;
    name="clouds.bmp"
Content-Transfer-Encoding: base64
Content-Disposition: attachment;
    filename="clouds.bmp"
//cAf//////////////////////////////////////////////
////////////9wB//////////////////////////////////////
/////////////////3AH//////////////////////////////////
/////////////////////////cAf/////////////////////////
//////////////////////////////9wB////////////
/////////////////////////////////////////////////3
AH//////////////////////////////////////////////
///////////cAd3d3d3d3d3d3d3d3d3d3d3d3d3d3d3d3d3d3d3d3d3d3d3d3d3d3d3d3d3
d3d3d3d3d3d3d3d3d3d3d3d3d3d3dwA=
------=_NextPart_000_008B_01BD8E64.C7C0B150--

FIG. 13

From: "Sender" <sender@tkhr.com>
To: "Recipient" <recipient@tkhr.com>
Subject: Test
Date: Tue, 2 Jun 1998 20:26:53 -0400
MIME-Version: 1.0
Content-Type: multipart/mixed;
        boundary="----=_NextPart_000_008B_01BD8E64.C7C0B150"
This is a multi-part message in MIME format.
------=_NextPart_000_008B_01BD8E64.C7C0B150
Content-Type: multipart/alternative;
        boundary="----=_NextPart_001_008C_01BD8E64.C7C237F0"
------=_NextPart_001_008C_01BD8E64.C7C237F0
Content-Type: text/plain;
        charset="iso-8859-1"
Content-Transfer-Encoding: quoted-printable This is the email message!

------=_NextPart_001_008C_01BD8E64.C7C237F0
Content-Type: text/html;
        charset="iso-8859-1"
Content-Transfer-Encoding: quoted-printable
<HTML>
<body background="http://www.exampledomain.com/tkhr_ad.jpg">
From: "sender" <sender@tkhr.com><br>
To: "recipient" <recipient@tkhr.com><br>
Subject: Test<br>
Date: Tue, 2 Jun 1998 19:07:10 -0400<br>
This is the email message!<br>
</HTML>
------=_NextPart_001_008C_01BD8E64.C7C237F0--
------=_NextPart_000_008B_01BD8E64.C7C0B150
Content-Type: image/bmp;
        name="clouds.bmp"
Content-Transfer-Encoding: base64
Content-Disposition: attachment;
        filename="clouds.bmp"
//cAf//////////////////////////////////////////////
///////////9wB//////////////////////////////////////
////////////////////////3AH///////////////////////
//////////////////////////////cAf/////////////////
/////////////////////////////////////////9wB///////////
//////////////////////////////////////////////////3
AH///////////////////////////////////////////////
/////////cAd3d3d3d3d3d3d3d3d3d3d3d3d3d3d3d3d3d3d3d3d3d3d3d3d3d3d3d3d3d3

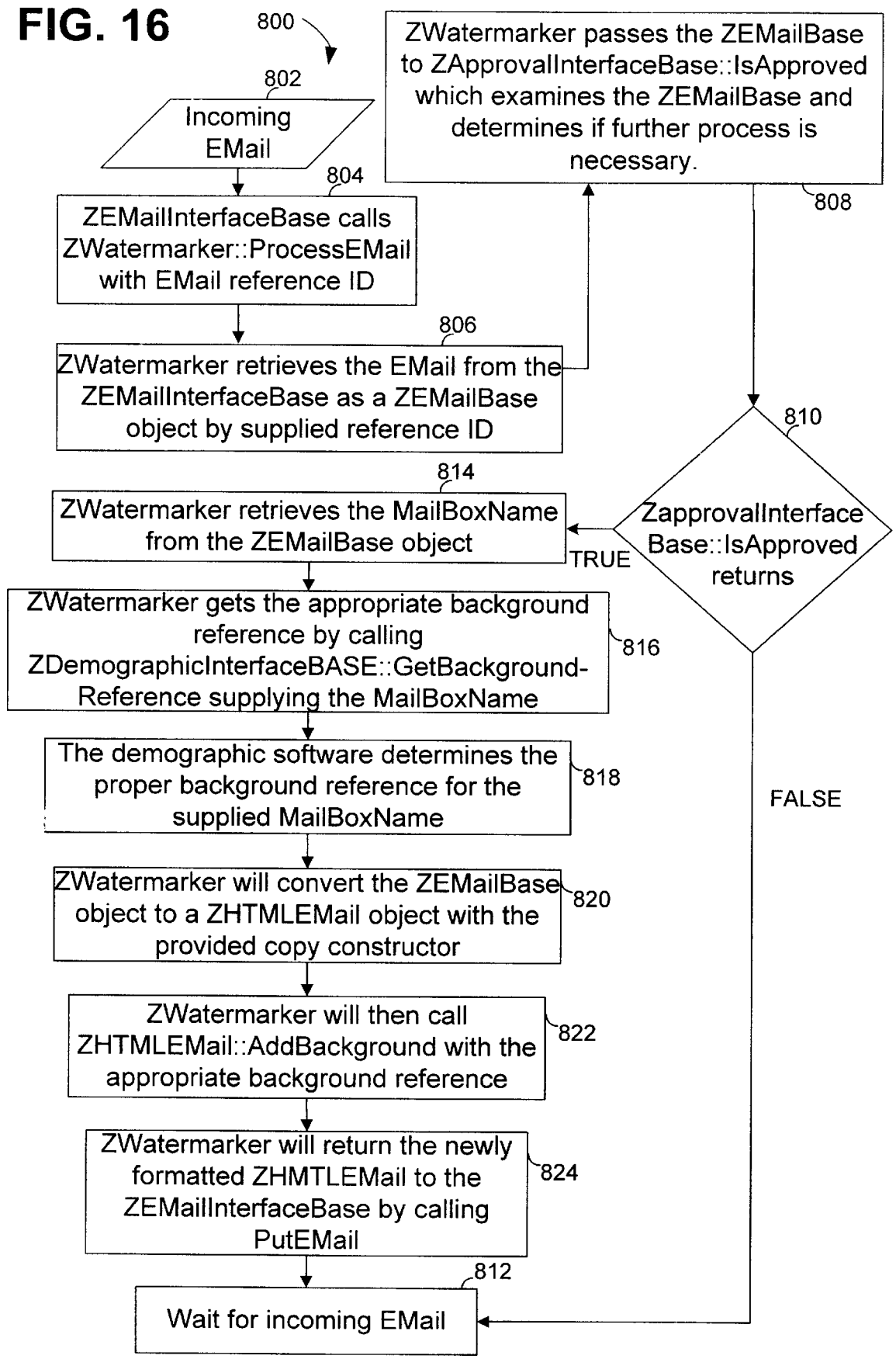

BACKGROUND ADVERTISING SYSTEM

CROSS-REFERENCES TO RELATED APPLICATIONS

This application claims the benefit of U.S. Provisional Application No. 60/088,149, filed Jun. 5, 1998, which is incorporated herein by reference in its entirety.

BACKGROUND OF THE INVENTION

The present invention relates generally to the field of advertising systems, and more particularly to the field of Internet advertising.

The worldwide network of computers connected through the Transmission Control Protocol/internet Protocol (TCP/IP) communications standard, commonly known as the Internet, has seen explosive growth during the last several years. This growth has been fueled in part by the introduction and widespread use of so-called "web" browsers, which allow for simple graphical user interface (GUI) access to network servers, which support documents formatted as so-called web pages. The World Wide Web (WWW), or "web", is a collection of servers on the Internet that utilize a Hypertext Transfer Protocol (HTTP), which is an application protocol that provides users access to files (which can be in different formats such as text, graphics, images, sound, video, etc.) using a Standard Generalized Markup Language (SGML), which is an information management standard for providing platform-independent and application-independent documents that retain formatting, indexing, and linking information. SGML provides a grammar-like mechanism for users to define the structure of their documents and the tags they will use to denote the structure in individual documents. The page description language known as Hypertext Markup Language (HTML) is an application of SGML. HTML provides basic document formatting of text and images and allows the developer to specify hyperlinks, or "links," to other servers and files. Use of an HTML-compliant client, such as a web browser, involves specification of an address via a Uniform Resource Locator (URL). Upon such specification, the client makes a TCP/IP request to the server identified in the URL and receives a "web page" (namely, a document formatted according to HTML) in return.

Electronic mail (E-mail) is another important part of online activity. Conventional e-mail is the exchange of text messages and computer files over a communications network, such as a local area network or the Internet, usually between computers or terminals. Routing of e-mail on the Internet is typically accomplished through the use of a protocol for sending messages called the simple mail transfer protocol (SMTP). Multipurpose Internet mail extensions (MIME) extend SMTP to permit data, such as video, sound, and binary files, to be transmitted by Internet e-mail without having to be translated by the e-mail client into ASCII format. This is accomplished by the use of MIME types, which describe the contents of a document. A MIME-compliant client application sending a file, such as one of various conventional e-mail programs, assigns a MIME type to the file. The receiving application, which must also be MIME-compliant, refers to a standardized list of documents that are organized into MIME types and subtypes to interpret the content of the file. MIME is part of HTTP, and both web browsers and HTTP servers use MIME to interpret e-mail files they send and receive. Post Office Protocol 3 (POP3) is a recent version of a standard protocol for receiving e-mail. POP3 is a client-server protocol in which e-mail is received and held in a mailbox for a user by a network server. Periodically, the end user checks the mailbox on the network server and downloads any e-mail. An alternative protocol is Interactive Mail Access Protocol (IMAP), according to which a user views e-mail at the server as though it was on the user's computer, and an e-mail message deleted locally is still on the server. Thus, POP3 can be thought of as a "store-and-forward" service, while IMAP can be thought of as a remote file server. Therefore, an e-mail message is typically sent with SMTP, and after a network server receives the e-mail message on the end user recipient's behalf, the e-mail message is typically read by the end user using POP3 or IMAP.

In addition to older basic e-mail systems, including basic ASCII e-mail clients using SMTP and POP3, some enhanced e-mail clients, such as Eudora Pro Email v. 4.0, display HTML portions of messages according to HTML formatting contained in the e-mail message bodies. Also, web-based e-mail systems, such as are currently offered by Hotmail™ and Yahoo™, are accessible through web browsers. In those systems, e-mail messages are formatted into web pages, or portions thereof, for formatted viewing control through web browsers. Thus, plain text e-mail messages received by those web based e-mail systems are converted into web pages for viewing by web browsers.

Shared public message networks include Usenet Newsgroups, Internet Relay Chat, Fidonet, RIME, ILINK, and a host of others. Public message networks also include public message areas in proprietary online systems. Most are normally set up according to separate general interest categories (e.g., "conferences," "forums," or "newsgroups"), subjects within those categories (e.g., "subjects," "topics," or "threads"), and finally individual messages or postings within each subject, typically arranged chronologically, as well as according to earlier messages to which they respond. Also included in this category of public messaging are instant messaging programs, which allow users to communicate publically with other users in real time. These conferences typically are carried by many online systems regionally, around the country, or even around the world. Newsgroups also have an Internet protocol which governs their transmission called network news transfer protocol (NNTP). As with e-mail clients, public messages are also accessible through web browsers, enhanced public messaging clients capable of displaying HTML formatting, and basic ASCII clients.

The recent growth of information applications on international public packet-switched computer networks, such as the Internet, suggests that public computer networks have the potential to establish a new kind of open marketplace for goods and services. As web pages, discussion forums and e-mail communications are used more nationally and internationally, it is highly desired that manufacturers and merchants be able to non-offensively advertise their goods and services to users during their regular course of Internet activity. With only limited success, such advertising has been done through the use of images as well as text transferred over the Internet. Advertisements transferred over the Internet often, but not always, make use of trademarks. A "trademark" is a word, design, color, sound, smell, etc., or any combination thereof, used by a manufacturer or merchant to identify their goods and/or services and distinguish them from others. In general, advertisements include most types of communications promoting goods and/or services of organizations or individuals, as well as promoting the organizations or individuals themselves. Entities with access to potential viewers of advertisements often charge a fee to other entities interested in advertising themselves and/or their goods and/or services.

On the Internet, as in more traditional venues of advertising, such as billboards, TV commercials, products, etc., most advertisements (ads) include promotional material intended to be used to interest consumers with particular goods or services. Currently, one primary way to advertise on the Internet is through ad banners, which often contain static or animated images, with or without trademarks, and normally advantageously function as hyperlinks to advertisement owner web pages. Unfortunately, banner ads often disappear with scrolling by the user and take up precious screen space. Furthermore, because of typically large graphical content, banner advertisements are often slow in downloading. As a result, users often move down a web page or to another web page and do not wait for advertisements to complete the downloading process if text or other content is displayed before, or simultaneously with, the advertisements, thereby clearly diminishing the impact of the advertisements. If text or other content is displayed only after an advertisement is completely downloaded, users may become very frustrated with the owner of the advertisement if the wait time is prolonged. Interstitial displays, such as splash screens which appear in between web page requests and before a web page is actually delivered, also provide advertisement opportunities, but they are often extremely brief, thereby greatly lessening their effect.

Others have addressed the problem of getting advertisements to an end user through the use of screensavers, such as a product commercialized by PointCast, Inc., Sunnyvale, Calif., as described in U.S. Pat. No. 5,740,549 to Reilly, et al. Although the screensaver program approach does appear to be capable of communicating advertisements to some users, there are clearly disadvantages to displaying these advertisements in an area outside of the normal user work area during times of inactivity when a user may typically not be looking at the display. In addition, the extra steps required to install and update such software can be too complicated or cumbersome for some users. Advertisers also have used broadcast e-mails and public postings to send advertisement messages from themselves containing plain text, as well as HTML formatting for more effective display. In general, e-mail messages and public postings containing hyperlinks pointing to additional information are also known, such as described in U.S. Pat. No. 5,790,793. Unfortunately, users often immediately delete unsolicited e-mail messages, as well as those sent from unknown senders.

Outside the Internet, top of mind awareness (TOMA) advertising acquaints the public with advertisers' brand-names, logos, trademarks, etc., through selective infiltration and saturation in the market. The purpose of such advertising is not to compel immediate purchase, but to enhance public awareness of the availability of the product from a particular manufacturer or merchant, so that when shoppers are at the retail markets to make purchases, they will recognize brands and immediately have higher perceived values of those products in relation to like products by other manufacturers or merchants. The key to a TOMA campaign is repetition since the more times that an individual is exposed to a particular brand-name, logo, trademark, etc., the more likely that individual will buy a particular product when making a buying decision in the future. Unfortunately, on the Internet, TOMA advertising is rarely accomplished successfully since, as discussed above, most conventional Internet advertising methods often result in very limited exposure to users. This conclusion is evidenced by the attention brokerage system described in U.S. Pat. No. 5,794,210, which actually teaches a method of compensating users for paying attention to advertisements on the Internet.

There is, therefore, a need for an advertising system for addressing these and other needs and problems.

BRIEF SUMMARY OF THE INVENTION

An advertisement system and method are provided for inserting into an end user communication message a background reference to an advertisement. In some preferred embodiments of the present invention, the background reference causes an advertisement image to be tiled, or watermarked, across an end user screen behind the text of an e-mail message or public posting. A message server inserts the background reference after receiving a message originally sent from an end user originator and before sending the message to be delivered to an end user recipient. When necessary, the message server will convert at least a portion of the message into a proper format, such as HTML, before inserting the background reference to an advertisement, which is preferably selected in accordance with end user recipient demographic information and/or ad exposure statistics. The advertisement itself, often a graphical file, is preferably not transmitted with the message in some preferred embodiments of the invention, but is typically stored at the message server or other location remote from the end user recipient. In some embodiments, the message server will also maintain and refer to records on each end user recipient to allow for selective enablement of background reference insertion and overwriting based upon end user preferences. According to various "non-web" example embodiments, the message server receives an SMTP or NNTP message and transmits an SMTP, POP3 or NNTP message with an HTML portion for a respective HTML-compatible client. In other "web-based" embodiments, the message server transmits the entire message in HTML to be used as a stand-alone web page or as a portion of a larger page employing frames or tables.

Since the advertisement is placed in the background when viewed by a user, it is normally non-clickable, ie., not a hyperlink to another HTML page. While this novel system of advertising is unusual since a typical user may initially desire, as with conventional banner advertisement, to click on the background image to go to another web page owned by the advertiser for more information or for ordering a product, the user will often be exposed to the tiled advertisement longer, and many times subliminally, while reading the content of the message, and the user may also be initially surprised to see an advertisement in the background of an e-mail message which may be from a known originator, thus increasing the awareness and exposure. Background images may also be very small in comparison to banner advertisements, thus downloading relatively quickly. While the scope of the present invention is also intended to include inserting a reference to any type of background image or graphic, including non-advertisements, the method of inserting a reference to an advertisement is considered particularly useful and beneficial in view of the above unexpected advantages, among others. In addition, Internet service providers, web site owners, e-mail service providers, newsgroup services and other end user communication providers are able to extract revenue for non-obtrusive advertising on 100% of the active screen area while still providing a work area for users to perform desired functions. In addition, this display does not necessarily affect current advertisement banners being displayed. Other features and advantages of various preferred embodiments of the present invention will become apparent to one with skill in the art upon examination of the following drawings and detailed description.

BRIEF DESCRIPTION OF THE SEVERAL VIEWS OF THE DRAWINGS

The accompanying drawings incorporated in and forming a part of the specification illustrate several aspects of the present invention, and together with the description, serve to explain the principles of the invention.

FIG. 6 is an illustration of selected basic components of an example end user e-mail communication message as sent by an end user originator, in accordance with one preferred embodiment of the present invention.

FIG. 7 is an illustration of the end user e-mail communication message of FIG. 6 converted completely into HTML for use in a web-based e-mail implementation of one preferred embodiment of the present invention.

FIG. 11 is an illustration of selected basic components of an example end user e-mail communication message that is not in MIME format and that has an attachment, in accordance with the preferred embodiment of FIG. 10.

FIG. 12 is an illustration of an example message similar to that of FIG. 11 converted into MIME format.

FIG. 13 is an illustration of an example message similar to that of FIG. 12 converted into a multipart/alternative part MIME format with an HTML part including a background reference.

FIG. 16 is a flowchart showing selected e-mail processing steps of the advertising system implementation portion represented by FIG. 14.

Figure 1:
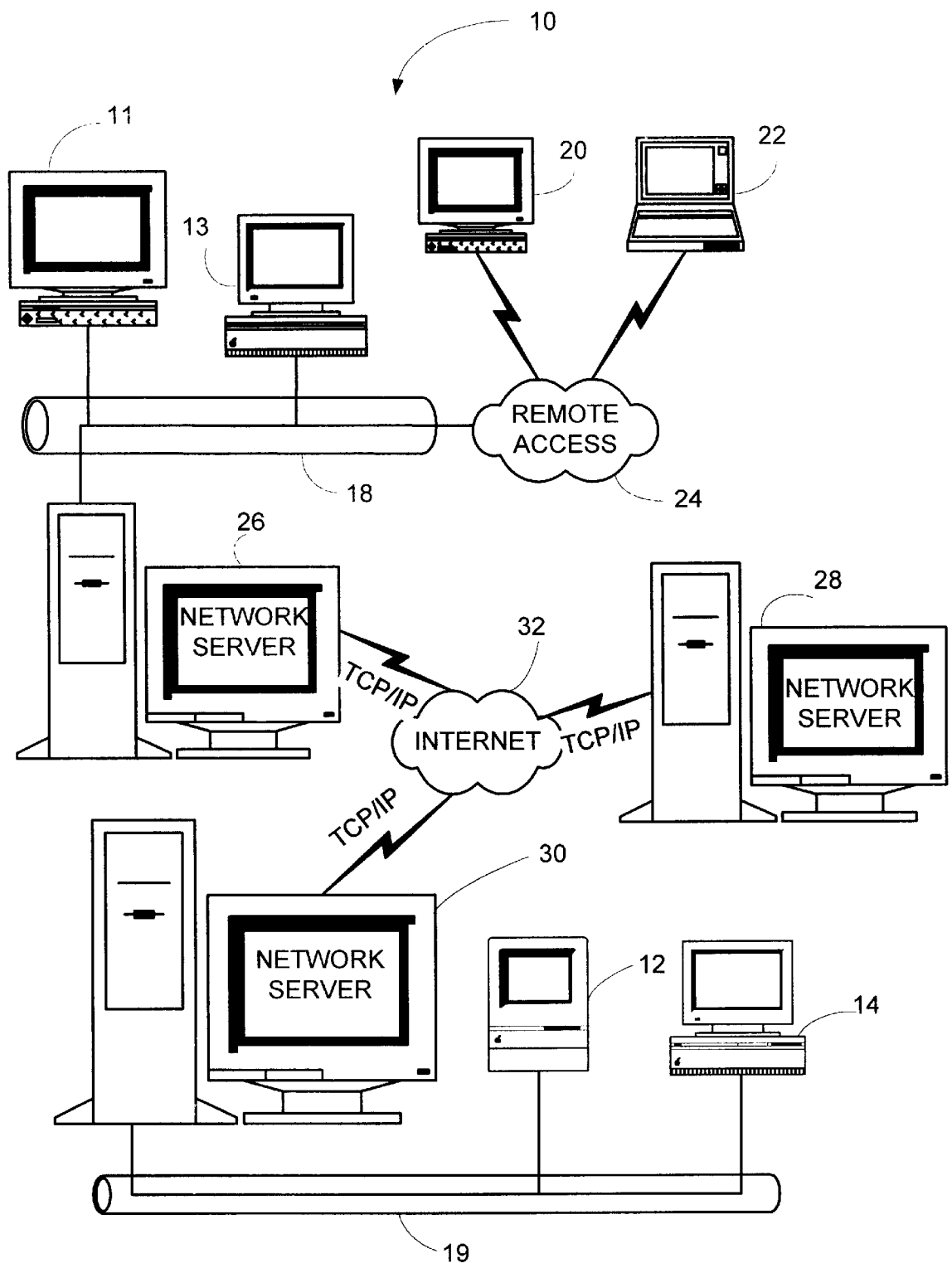
FIG. 1 is a block diagram illustrating physical components of one implementation of the present invention.

Reference will now be made in detail to the description of the invention as illustrated in the drawings. While the invention will be described in connection with these drawings, there is no intent to limit it to the embodiments disclosed therein. On the contrary, the intent is to cover all alternatives, modifications and equivalents included within the spirit and scope of the invention as defined herein and by the appended claims.

DETAILED DESCRIPTION OF THE INVENTION

Turning now to the drawings, wherein like reference numerals designate corresponding parts throughout the drawings, FIG. 1 is a block diagram illustrating physical components 10 of one implementation of the present invention, which has flexibility, expandability, and platform independence. While system configuration can take many forms in accordance with scope of the present invention, the diagram of FIG. 1 illustrates a plurality of end user workstations 11, 12, 13 and 14 directly connected to networks 18 and 19, acceptable examples of which include, among others, local area networks (LANs) and Intranets. Additional workstations 20, 22 are remotely located and in communication with the network 18 through a remote access network 24. Network servers 26, 28, and 30, one or more of which are capable of functioning as a message server to perform the background reference insertion methods in accordance with the present invention, as discussed below, are shown connected to each other through an Internet 32, with conventional routers and switches omitted for clarity, but understood by those reasonably skilled in the art of the present invention. Such network servers are configured to support one or more conventional communication protocols, including, but not limited to, SMTP, POP3, IMAP, NNTP, HTTP, etc. Of course, the elements of FIG. 1 are understood to be representative of multitudes of similarly connected components, and various types of conventional workstations are understood to be connected to the Internet 32 through conventional schemes.

In one application of the physical components 10, one end user organization owns and maintains the components directly connected to network 18, and another end user organization owns and maintains the components directly connected to network 19. In that application, the network server 28 can be configured to insert background references into end user communications originated and received by any of the workstations 11, 12, 13, 14, 20, 22. For example, if an end user at workstation 20 sends an e-mail message to an end user at workstation 12, such a message could be routed through network server 26, network server 28 for background reference insertion, and then network server 30. Though not necessary, such routing could be prompted by the end user at workstation 12 maintaining an e-mail mailbox on network server 28. In another of the many applications of the physical components 10 included in the scope of the present invention, network server 26 is maintained by an Online Service Provider (OSP) to provide OSP customers using workstations 20, 22 access to the Internet 32, including e-mail mailboxes and access to the web and public messaging. In one example use of such an application, e-mail messages or public postings originated and/or received by an OSP customer would include background references inserted by network server 26, including those from and/or to other customers of the OSP and others outside the OSP, as configured by the OSP. As with the former application, OSP customers may also maintain mailboxes on network server 28. Clearly, these applications are merely examples, and other applications of the physical components 10 are also contemplated such that any network server is capable of functioning as a message server to perform the background reference insertion method of the present invention, as discussed below, without regard to whether mailboxes or user accounts are maintained by the message server.

Figure 2:
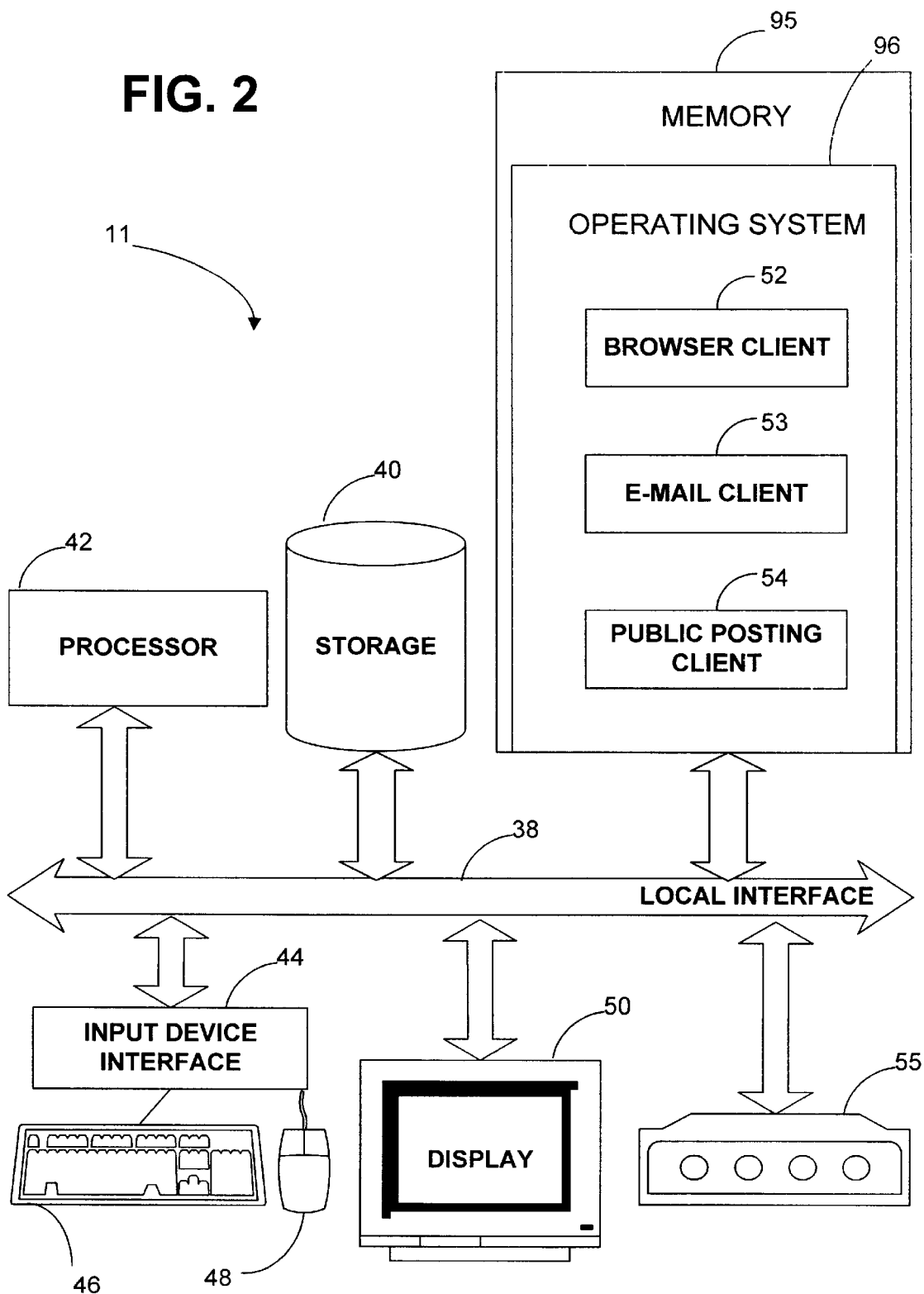
FIG. 2 is a block diagram illustrating one type of end user workstation in accordance with one preferred embodiment of the present invention.

Refer now to FIG. 2, which is a block diagram illustrating one type of end user workstation 11, in accordance with one preferred embodiment of the present invention. A local interface 38, such as a conventional computer bus, is shown connected to a variety of components, including a storage unit 40, a processor 42, an input device interface 44 providing an interface to the local interface 38 for a conventional keyboard 46 and mouse 48, a display 50 for displaying information for being viewed by a user, a modem/network interface 55 for providing connectivity to other computers and networks, and memory 95. One example, among others, of an acceptable storage device 40 is a conventional hard drive, which is used for non-volatile storage of programs and other data which are loaded into memory 95 for operation of the workstation 11 and used by processor 42 to control operation of the workstation 11. Such programs (also referred to as applications, systems, software, etc.) typically include, among others, an operating system 96, a browser client 52, an e-mail client 53, and a public posting client 54. Examples of acceptable operating systems 96 include, among others, Microsoft® Windows® and Unix. Examples of acceptable browser clients 52 include, among others, Microsoft® Internet Explorer and Netscape Navigator. One example, among others, of an acceptable e-mail client is Eudora Pro Email v4.0. One example, among others, of an acceptable public posting client 54 is Microsoft® Outlook Express, which also functions as an acceptable e-mail client. Some web browser clients also function as non-web based newsgroup and e-mail clients, thus also serving as enhanced readers of NNTP and POP3 information. Of course, the scope of the present invention is intended to include, but not be limited to, any client capable of displaying end user information with a definable background from any type of electronic feed, including but not limited to, web pages, e-mail messages, public postings, etc.

Figure 3:
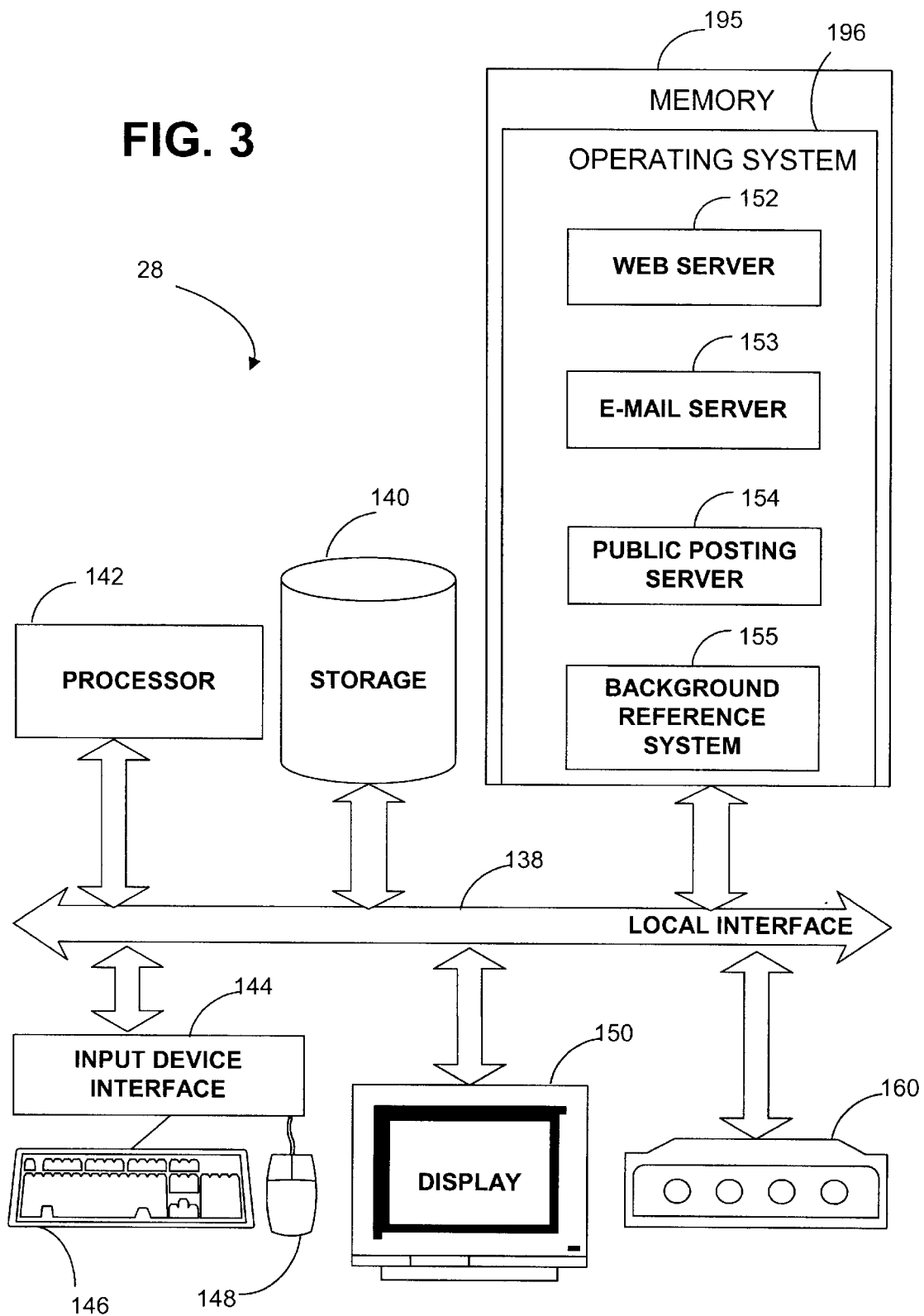
FIG. 3 is a block diagram illustrating one type of network server in accordance with one preferred embodiment of the present invention.

Referring back to FIG. 1, one example implementation and application of the present invention includes the network server 28 functioning as a message server for inserting advertisement background references into end user messages. Refer now to FIG. 3, which shows a block diagram representation of selected elements of one type of network server 28, which is shown including hardware elements similar to those of the example workstation 11 shown in FIG. 2. For example, a local interface 138, such as a conventional computer bus, is shown connected to a variety of components, including a storage unit 140, a processor 142, an input device interface 144 providing an interface to the local interface 138 for a conventional keyboard 146 and mouse 148, a display 150, a modem/network interface 160 for providing connectivity to other computers and networks, and memory 195. One example, among others, of an acceptable storage device 140 is a conventional hard drive, which is used for non-volatile storage of software programs and other data which are loaded into memory 195 for operation of the network server 28 and used by processor 142 to control operation of the network server 28. However, the network server 28 executes software programs (also referred to as applications, systems, software, etc.) which are different from those of the workstations. For example, in accordance with one implementation, software executed by the network server 28 executes a web server 152, e-mail server 153, public posting server 154, such as a newsgroup server, and background reference system 155. In other implementations, network server 28 executes background reference system 155 in combination with one or more of the web server 152, public posting server 154, e-mail server 153, or other end user message server software. In addition, while one implementation of the present invention includes separate background reference system 155 which communicates with one or more end user message server software programs, other implementations include integrated end user message software solutions which directly incorporate the functionality of the background reference system 155.

In addition, the background reference system 155 of the present invention can be implemented in hardware, software, firmware, or a combination thereof. In one preferred embodiment, the background reference system 155 is implemented in software or firmware that is stored in a memory and that is executed by a suitable instruction execution system. The background reference system 155, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. Examples, among many others, of acceptable software implementation environments include Java, Javascript, C++, etc. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 4:
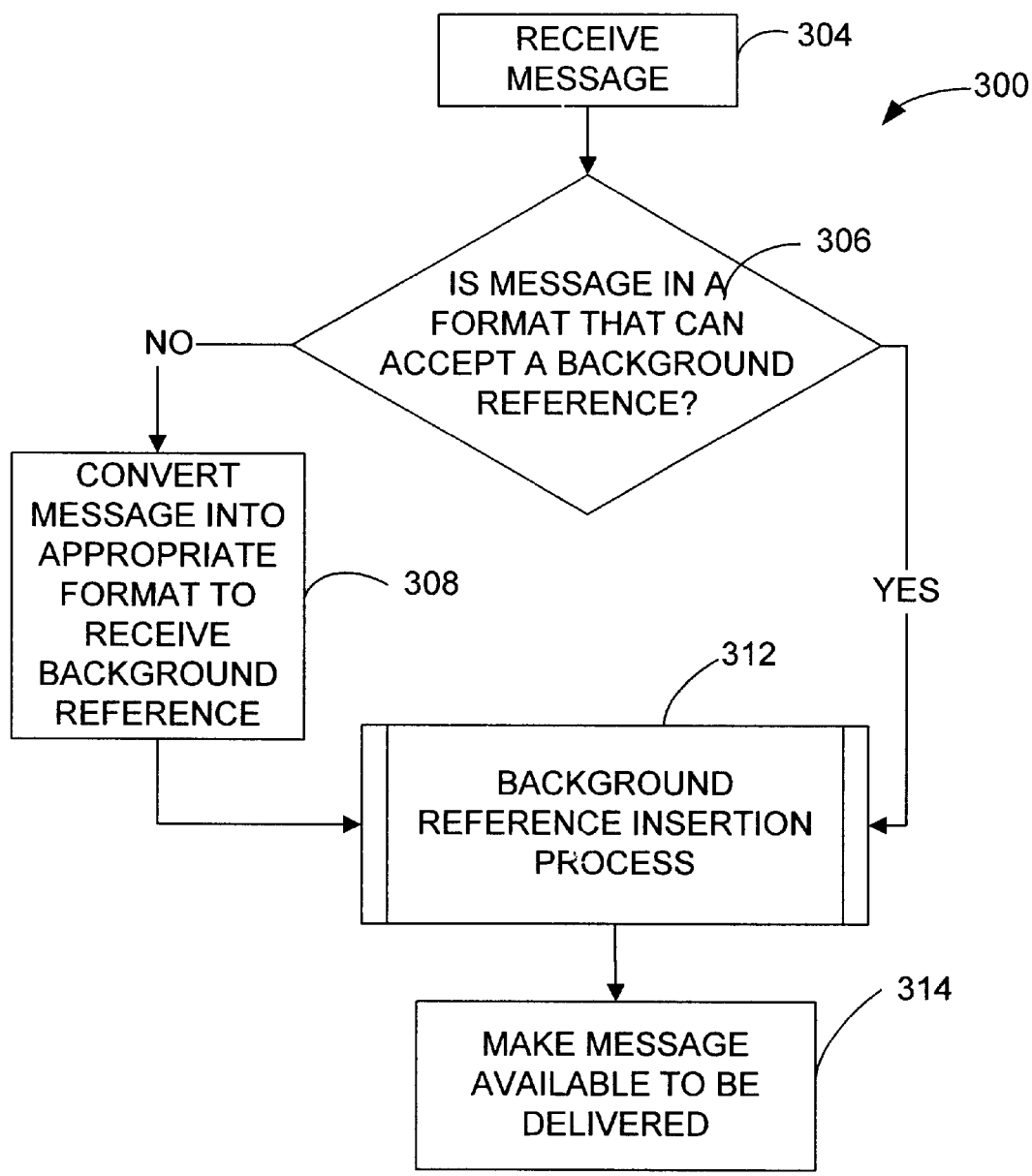
FIG. 4 is a flowchart showing general operation steps of the background reference system of the present invention in accordance with one preferred embodiment.
Figure 5:
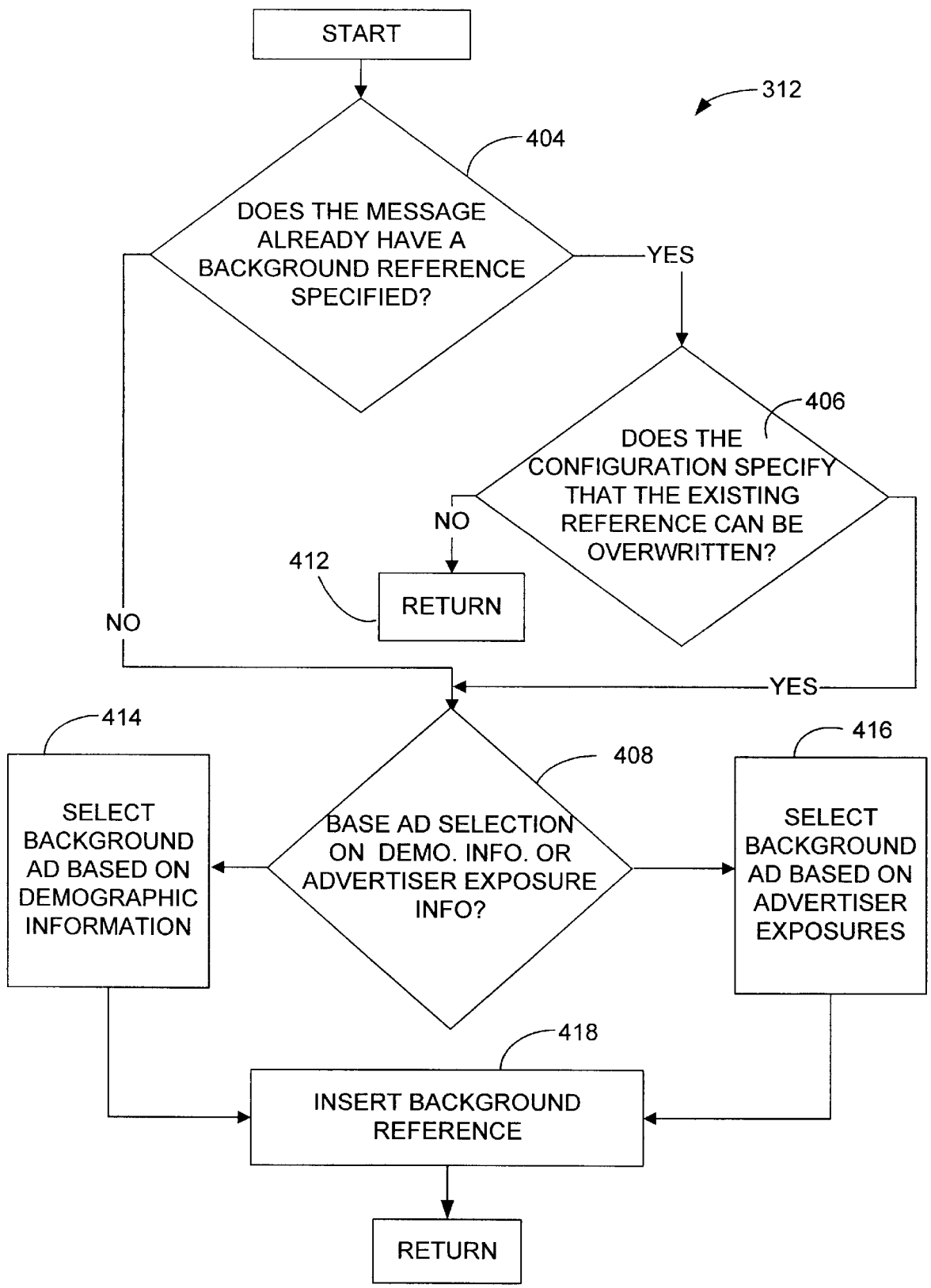
FIG. 5 is a flowchart showing the operation of one implementation of a background reference insertion process of FIG. 4.

Refer also to FIG. 4, which is a flowchart showing general operation steps 300 of the background reference system 155 of the present invention, in accordance with one preferred embodiment. The background reference system 155 receives an end user communication message in step 304, such as, for example, through an SMTP or NNTP gateway from the Internet 32 (FIG. 1), through a POP3 or IMAP mailbox, or through any other communication connection method for intercepting or otherwise accessing an end user communication message sent toward at least one end user recipient from an end user originator. The background reference system 155 determines if the received message is in a format, such as HTML as one example, that can accept a reference to a background, such as an advertising image as one example. If the message is not in such a format, such as plain text as one example, the message is converted into an appropriate format to accept a background reference, as indicated in step 308. If the message is already in such a format, or after the message is converted into such a format in step 308, an appropriate background reference is added to the message, such as through a background reference insertion process 312, an example of one implementation of which is shown in FIG. 5 and discussed below. Subsequently, as indicated in step 314, the end user message is made available for delivery to one or more end user recipients. In some embodiments and implementations of the present invention, this step includes sending and actually delivering the message to one more end users in user dependent formats.

Refer now to FIG. 5, which shows the operation of one implementation of the background reference insertion process 312 of FIG. 4. The implementation of FIG. 5 is related to an advertisement system, but it should be understood that the present invention includes inserting references to any type of background into end user messages. In addition, included in the scope of the present invention are practically all technologies through which a background, tiled or not tiled on an end user recipient's screen, is designated for an end user communication message, including client-based solutions and future technologies for accomplishing the described functions. Nonetheless, it should be clear that while the scope of the present invention is also intended to include inserting a reference to any type of background image, graphic, etc., including non-advertisements, the method of inserting a reference to an advertisement is considered particularly useful and beneficial, as discussed above.

According to the implementation of FIG. 5, it is first determined at step 404 whether the message already includes a background reference. While some embodiments of the present invention include determining if any type of background reference is specified, including a mere designation of a color, other embodiments include checking only for a designation of a separate image file as a background. In addition, some embodiments will include making this determination only for messages previously determined in step 306 to already be in a format that can accept a background reference since such messages are more likely to already include a background reference. If the message already includes a background reference, step 406 determines if an approval configuration specifies whether the background reference can be overwritten with a new background reference. If the approval configuration indicates that background references are not to be overwritten for a particular message, step 412 indicates that the background reference insertion process 312 terminates without overwriting the existing background reference. An approval configuration file is maintained in one embodiment of the present invention in order to enable end user recipients to configure the background reference system 155 (FIG. 3) on whether or not to overwrite existing background references in messages received by them. In other embodiments, steps 404 and/or 406 are omitted, whereby there is automatic overwriting of all or no existing background references. Furthermore, the ordering of steps in the various flowcharts of the present invention are not intended to limit the scope of the present invention with respect to order of operation since other embodiments include varying the orders of the steps. As one example, in some embodiments, steps 404, 406 and 412 are instead executed after a message is received and before format determination is made in step 306. In still other embodiments, a general approval determination is included before format determination in order to determine if a particular end user recipient has approved any background reference insertions, regardless of whether any background references already exist.

In accordance with the implementation shown in FIG. 5, when the background reference system 155 determines that an existing background reference may be overwritten in step 406, or if it is determined that there is no background reference specified in step 404, then further determinations are made as to which advertisement should be referenced by a new background reference to be inserted (or overwritten if already present) into the message. Based on a determination in step 408, advertisements may be selected by the background reference system 155 based on available demographic information for a particular end user recipient (step 414) and/or on advertiser and advertisement exposures (step 416). In a web-based "free" e-mail implementation, acquisition of demographic information is required before the e-mail account is provided to a user. If demographic information is not available or is otherwise inconclusive for targeted advertisements, commitments to advertisers may drive the selection from a pool of available advertisers. Of course, as advertisements are selected based on demographic categories or exposure requirements, records are maintained for future selection and reporting purposes. There are many conventional demographic and advertisement pool processing systems currently available and understood by those reasonably skilled in the art of the present invention. Although only two types of advertisement selection criteria have been discussed, it should be understood that other criteria can be used without departing from the spirit of the present invention. Of course, advertisements should be constructed in color and design to not interfere with end user recipients being able to read the foreground message text.

Once an appropriate advertisement has been selected in steps 414 or 416, a background reference to that advertisement is inserted into the message at step 418. In one implementation of the present invention in HTML, a background tag, such as <body background= "AdvertisementFile">, is inserted into an HTML portion of a message, where "AdvertisementFile" is the name of a stored advertisement file. The advertisement file itself, often a graphical file, is preferably not transmitted with the message in some preferred embodiments of the invention, but is typically stored at the message server or other location remote from the end user recipient. In web-based embodiments, the background file may be co-located, and in a similar storage directory or folder, with the web page message or located remotely from the web page message. If the background file is co-located with the web page message in the same storage directory or folder, the background reference need only include the name of the background file. Otherwise, preamble directory names or fill URL addresses beginning with "http:/www", etc., are necessary since the background file can be located anywhere on the Web in some embodiments.

In some web-based embodiments where messages are stored on a network server after viewing by an end user recipient, the background reference insertion steps of the present invention are repeated each time the end user views the message to show the end user a different background each time the message is viewed. In addition, in other embodiments, regardless of whether those embodiments are web-based, the actual background file referenced by the background reference is changed so that the end user recipient views a different background when the message is viewed subsequently. In still other embodiments, the URL is not an actual address of a known file, but a call to a separate server program, or script, to supply an unknown particular file chosen by the server program. Since the particular file supplied will automatically vary in some embodiments, end user recipients see different backgrounds each time the message is viewed. While apparently never having been associated with the insertion of background references into end user communication messages, some methods of calling a server program, or script, for receiving an unknown particular file are conventional and would be understood by those reasonably skilled in the art of the present invention, and are included within the scope of the present invention.

Some other embodiments include transmitting the advertisement file as an attachment along with the message for storage on an end user recipient workstation Of course, configuration or knowledge of the end user recipient downloading location would be necessary (e.g., c:\downloadfolder\) in constructing the proper address in the background reference of the downloaded advertisement, which would only need to be downloaded once in embodiments tracking which advertisements are downloaded to which end user recipients and selectively sending only those advertisements that have not previously been sent to particular end user recipients.

Figures 8, 9:
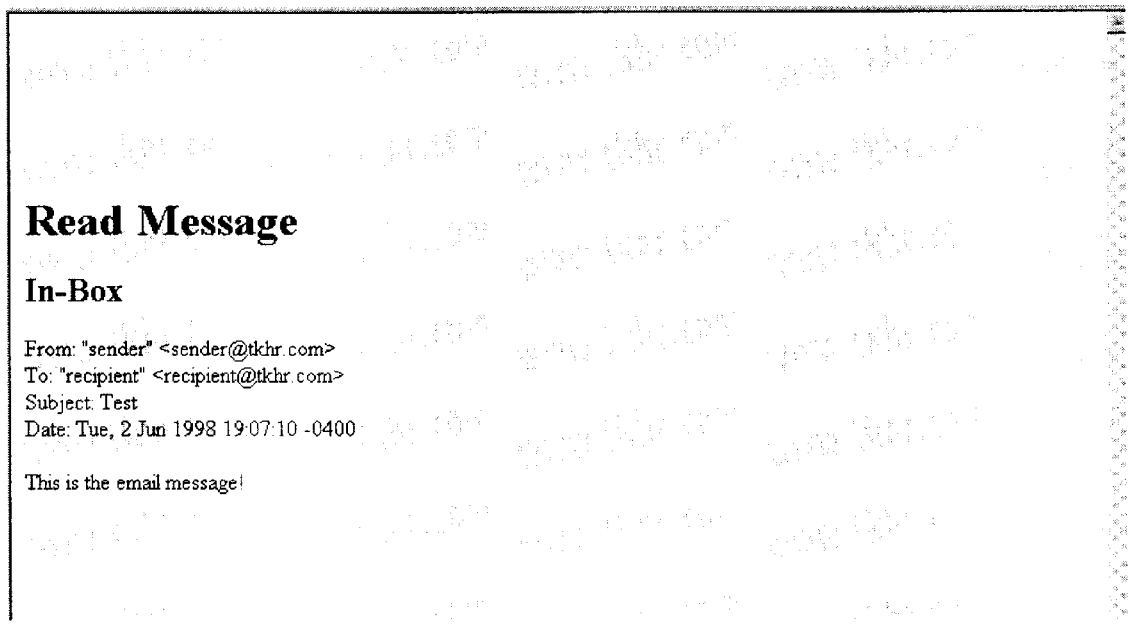
FIG. 8 is an illustration of the message of FIG. 7 with an inserted advertising background reference.
FIG. 9 is an illustration of a screen display of the message of FIG. 8.

FIG. 6 shows an illustration of selected basic components of an example end user e-mail communication message as sent by an end user originator, in accordance with one preferred embodiment of the present invention. Additional conventional header information is not shown for purposes of clarity, as is also often selectively the case with conventional e-mail clients. Referring also back to FIG. 4, if a message represented by the example message of FIG. 6 is received in step 304 of FIG. 4, it would be subsequently determined in step 306 that the message is not in format that can accept a background reference since the message is in plain text. Consequently, in step 308, the message would be converted into an appropriate format, such as HTML, an example of which is shown in FIG. 7. If, instead, a message represented by FIG. 7 was initially received at step 304, i.e., one which includes an HTML portion, as an example, it would already be in an appropriate format, and step 308 would not be executed. Subsequently, as discussed above with respect to background reference insertion process 312, a background reference is inserted into the message, an example of which is shown in FIG. 8. The example background reference shown in FIG. 8 is <body background= "http://www.exampledomain.com/tkhr_adjpg">. As discussed above, in some web-based embodiments storing advertisements in the same directory or folder as web page messages, the preamble can be omitted; thus, in the example shown in FIG. 8, the preamble "http://www.exampledomain.com/" could then be omitted.

FIG. 9 shows an illustration of a screen display of the example message of FIG. 8, where a tiled background image of a diagonal "www.tkhr.com" is shown as an example. Again, this image is not "clickable" since it is in the background of the screen, but e-mail messages and other end user communications can be branded, or watermarked, with virtually any background image as shown. In one implementation of a web-based e-mail system, the entire browser viewing area is used for displaying the message and background image, thus control buttons such as reply, reply all, forward, delete, close, download attachment, etc. are on another screen and are accessible by a back button on a browser, as is conventionally available in other web-based e-mail systems. In another implementation, the information shown in FIG. 9 is placed in a frame or table to share the browser viewing area with one or more other frames and/or tables containing controls. In yet another implementation, control buttons and additional information is inserted into the message itself. Of course, traditional banner advertisements may still be displayed in addition to the background.

Figure 10:
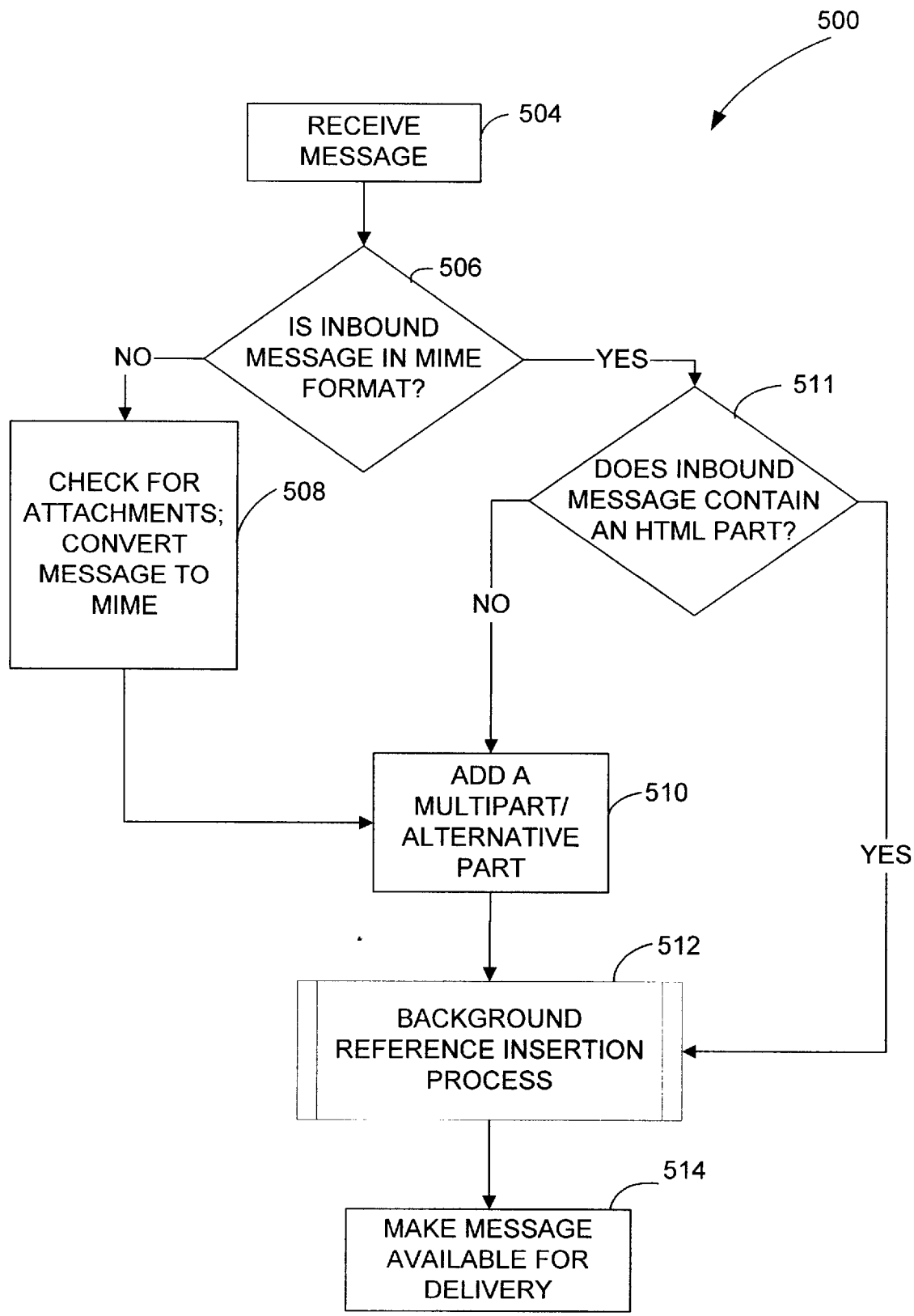
FIG. 10 is a flowchart showing the general operation of another preferred embodiment of the present invention in a non-web-based, SMTP/POP3 implementation of a background reference system accommodating an e-mail message with an attachment.

Refer now to the FIG. 10, which is a flowchart showing general operation steps 500 of another preferred embodiment of the present invention in a non-web based, SMTP/POP3 implementation of a background reference system accommodating an e-mail message with an attachment. This example is useful for end user recipients with MIME-compatible and HTML-compliant e-mail clients. In the example shown, after receiving a message in step 504, it is determined if the message is in a conventional MIME format in step 506. In this preferred embodiment, this determination can be performed by searching the message for the text "MIME-Version", for example, in a header field. Although this is the search criteria in this preferred embodiment, it should be understood that the scope of the present invention includes any search criteria that may be used in identifying whether a message is MIME formatted. If the message is not in a MIME format, it is checked for attachments included within the text of the message and converted into a MIME format in step 908. One such type of attachment is the conventional UUENCODED attachment, which is delineated by keywords "begin" and "end"; hence, in this preferred embodiment, the message is checked for characteristic placement of these keywords. Once converted, the message will include a "MIME-Version" header field, and any attachment will be converted into a MIME attachment portion. One example attachment conversion process includes converting from UUENCODE to base64, which is well defined and documented in Request for Comments (RFC) 2045, which is considered understood by those skilled in the art of the present invention and which is herein incorporated by reference. The converted attachments will be added as parts to the message, including the addition of separators as discussed in more detail in RFC 2045.

Next, a MIME multipart/alternative part with HTML is added in step 510.

The multipart/alternative designation offers an alternative version of the text of the message such that clients that support HTML can display it, and clients that do not can show the other alternative, which is usually plain text. The HTML part is essentially an HTML version of the e-mail message, the conversion to which would be understood by those reasonably skilled in the art of the present invention as similar to that discussed above with respect to step 308 (FIG. 4). If the message received in step 506 is already in a MIME format, it is determined in step 511 whether the message already contains an HTML part, such as through searching for an appropriately located string "text/html". If not, step 510 is executed as discussed previously. If so, as well as after step 510 is executed in the other two circumstances discussed previously, a background reference insertion process is executed in step 512, which is similar to the background reference insertion process 312 shown in FIG. 5. As with the embodiment discussed in FIGS. 4 and 5, the ordering of steps is changed in other embodiments, and previous determinations may affect subsequent determinations. For example, if it is known through steps 508 or 511 that the message does not contain an HTML part, steps 404, 406, and 412 need not be executed since it would already be known that no background reference is specified.

FIG. 11 is an illustration of selected basic components of an example end user e-mail communication message that is not in MIME format and that has an attachment, in accordance with the preferred embodiment of FIG. 10. The attachment, "clouds.bmp", is shown in a UUENCODED format between, and including, the words "begin" and "end." FIG. 12 is an illustration of an example message similar to that of FIG. 11 converted into MIME format with the attachment in base64 encoding. FIG. 13 is an illustration of an example message similar to that of FIG. 12 converted into a multipart/alternative part MIME format with an HTML part including a background reference. The HTML part begins with <HTML> and ends with </HTML>, and the example background reference is shown as <body background="http://www.exampledomain.com/tkhr_ad.jpg>. In an HTML-compatible, MIME-compliant e-mail client, the "clouds.bmp" attachment would be downloaded to the end user recipient's workstation, and the e-mail message would be displayed with a tiled background of the image file located at the referenced address. The "clouds.bmp" file is not intended to be the background file in this preferred embodiment, but as discussed above, other embodiments include sending the background file along as an attachment to the message. Thus, if the "clouds.bmp" file were the intended background file, and if it were known that the download directory on the end user recipient workstation was "c:\download", then the background reference would be similar to <body background="c:\download\clouds.jpg">.

Figure 14:
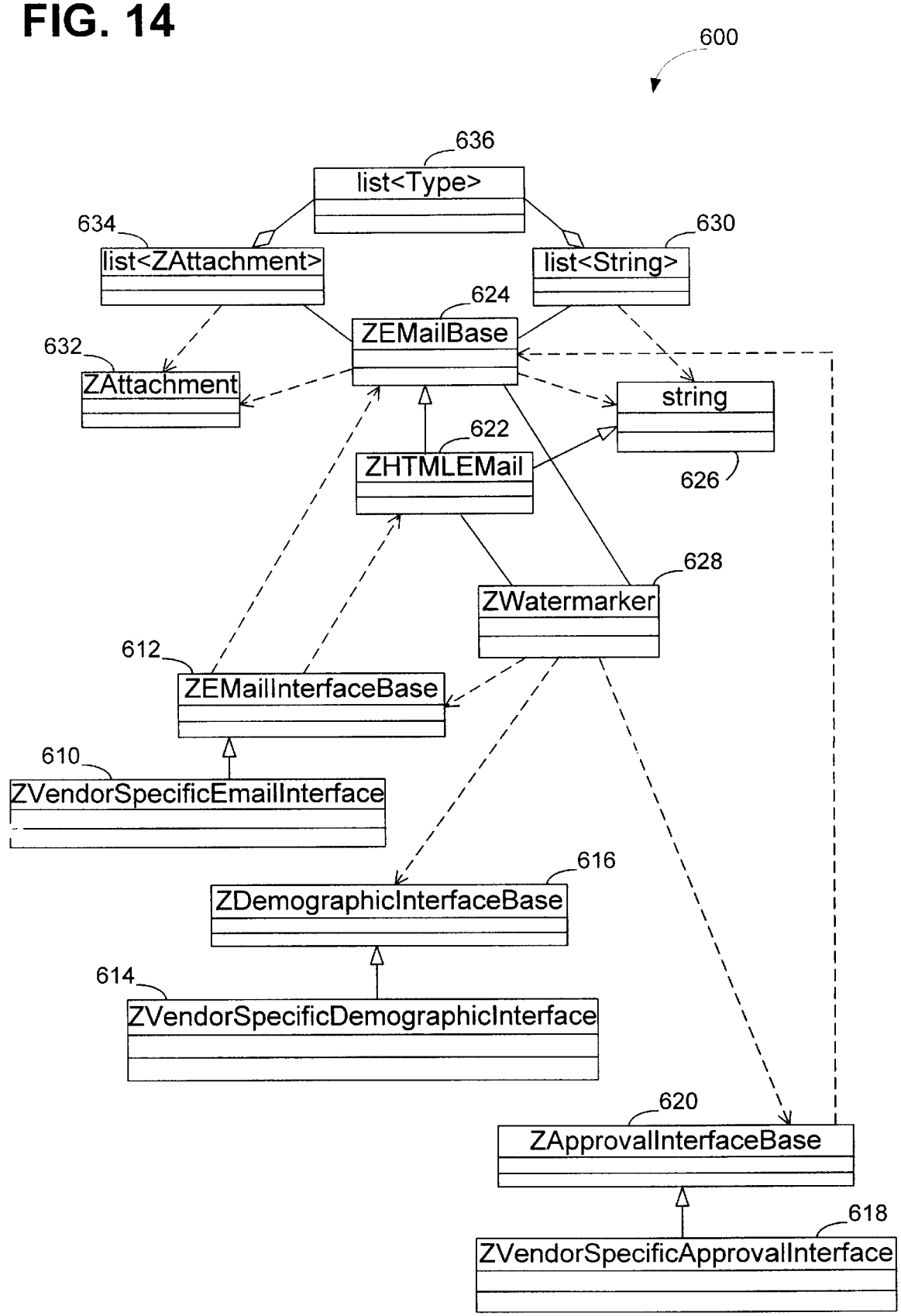
FIG. 14 is an object model diagram showing portions of one implementation of an advertising system in accordance with one preferred embodiment of the present invention.

Refer now to FIG. 14, which is an object model diagram 600 showing portions of one implementation of an advertising system in accordance with one preferred embodiment of the present invention. The method employed by the diagram 600, also known as a Rose model, is a unified modeling language, (UML), a standardized way of representing objects and their relationships to each other. In the diagram 600, a hollow arrow "inherits" (a first object inherits from a second object if the first object takes on the properties and behavior of the second object, i.e., the first object contains the properties and methods of the second object), a dotted line with an arrow is a dependency (using an object internally or during a function call as a parameter) and a straight solid line is an "association" (using an object internally without exposing it). Boxes shown in the diagram are object classes, which include member variables and methods. The letter "Z" merely signifies that the element is an object, i.e., standing for "the."

Thus, a ZVendorSpecificEmailInterface 610 inherits from a ZEMailInterfaceBase 612; a ZVendorSpecificDemographicInterface 614 inherits from a ZDemographicInterfaceBase 616; ZVendorSpecificApprovalInterface 618 inherits from a ZApprovalInterfaceBase 620; and a ZHTMLEMail 622 inherits from both a ZEMailBase 624 and a string 626. A ZWatermarker 628 has a dependency on the ZEMailInterfaceBase 612, the ZDemographicInterfaceBase 616, and the ZApprovalInterfaceBase 620, as well as an association with the ZHTMLEMail 622 and the ZEMailBase 624. The ZEMailInterfaceBase 612 also has dependencies on the ZHTMLEMail 622 and the ZEMailBase 624. The ZEMailBase 624 has dependencies on the string 626 and a ZAttachment 632, as well as associations with a list<String>630 and a list<ZAttachment>634, both of which are aggregates of a list<Type>636 and themselves have dependencies on the string 626 and ZAttachment 632, respectively. The ZApprovalInterfaceBase 620 has a dependency on the ZEMailBase 624. The list<Type>636 is a template class corresponding to a standard template library for dynamic compilation. A template class is a class which, at compile time, takes parameters passed to it and replaces those parameters internally. The ZEMailBase 624 contains Zattachment 632 and string 626 to store its contents.

Member variables and methods for the objects of FIG. 14 include the following, with colons ":" meaning "type" for members and "return type" for methods:

ZAttachment 632

MEMBERS m_ulLength: Long=0
m_pBinaryData: void*=NULL
m_Name: String=""

METHODS

ZAttachment ()
   GetData (): void*
   PutData (pData: void*=default, lDataLength: long=default):
   enumSuccessError
ZEMailBase 624

MEMBERS m_RecipientList: list<String>
m_CarbonCopyList: list<String>
m_Date: Date
m_sSender: String
m_sSubject: String
m_sBody: String
m_AttachmentList: list<ZAttachment>
m_lReferenceID: Long=0
m_sMailBoxName: String

METHODS

GetRecipientCount (): Long
GetRecipient (lIndex: Long): String
   GetCarbonCopyCount (): Long
GetCarbonCopy (lIndex: Long): String
GetDate (): Date
GetSender (): String
GetSubject (): String
GetBody (): String
GetAttachmentCount (): Long
GetAttachment (): ZAttachment
GetReferenceID (): Long
GetMailBoxName (): String
ZHTMLEMail 622

METHODS

ZHTMLEMail (EMailBaseToCopy: ZEMailBase&)
Construct (EMailBaseToCopy: ZEMailBase&): enumSuccessError
AddBackground (sBackgroundReference: String): enumSuccessError
ZWatermarker 628

MEMBERS m_pEMailInterfaceBase: ZEMailInterfaceBase*=NULL
m_pDemographicIInterface: ZDemographicInterface*=NULL
m_ pApprovalInterface: ZApprovalInterfaceBase*=NULL

METHODS

PutEmailInterface (pEMailInterface: ZEMailInterfaceBase*): enumSuccessError
PutDemographicInterface (pDemographicInterface: ZDemographicInterfaceBase*): enumSuccessError
PutApprovalInterface (pDemographicInterface: ZApprovalInterfaceBase*=default): enumSuccessError
ProcessEMail (lReferenceID: Long): enumSuccessError
ConvertEMail (): enumSuccessError
ZEMailInterfaceBase 612

METHODS

Register (pWatermarker: ZWatermarker*): enumSuccessError

GetEMail (1ReferenceID: DataType): ZEMailBase

PutEMail (HTMLEMail: ZHTMLEMail&): enunSuccessError

ZDemographicInterfaceBase 616

METHOD

GetBackgroundReference (MailBoxName: String): String

ZApprovalInterfaceBase 620

METHOD

IsApproved (rEMailBase: const ZEMailBase&=default): BOOL

Each of the vendor specific objects, including ZVendorSpecificEmailInterface 610, ZVendorSpecificDemographicInterface 614, and ZVendorSpecificApprovalInterface 618, are constructed to interface with specific vendor systems. Thus, such objects may be interchanged and used as necessary when working with different systems. Furthermore, the ZVendorSpecificEmailInterface 610 is replaced with a ZVendorSpecificNewsgroupInterface for NNTP interfacing, as well as any other type of end user messaging system needed.

Figure 15:
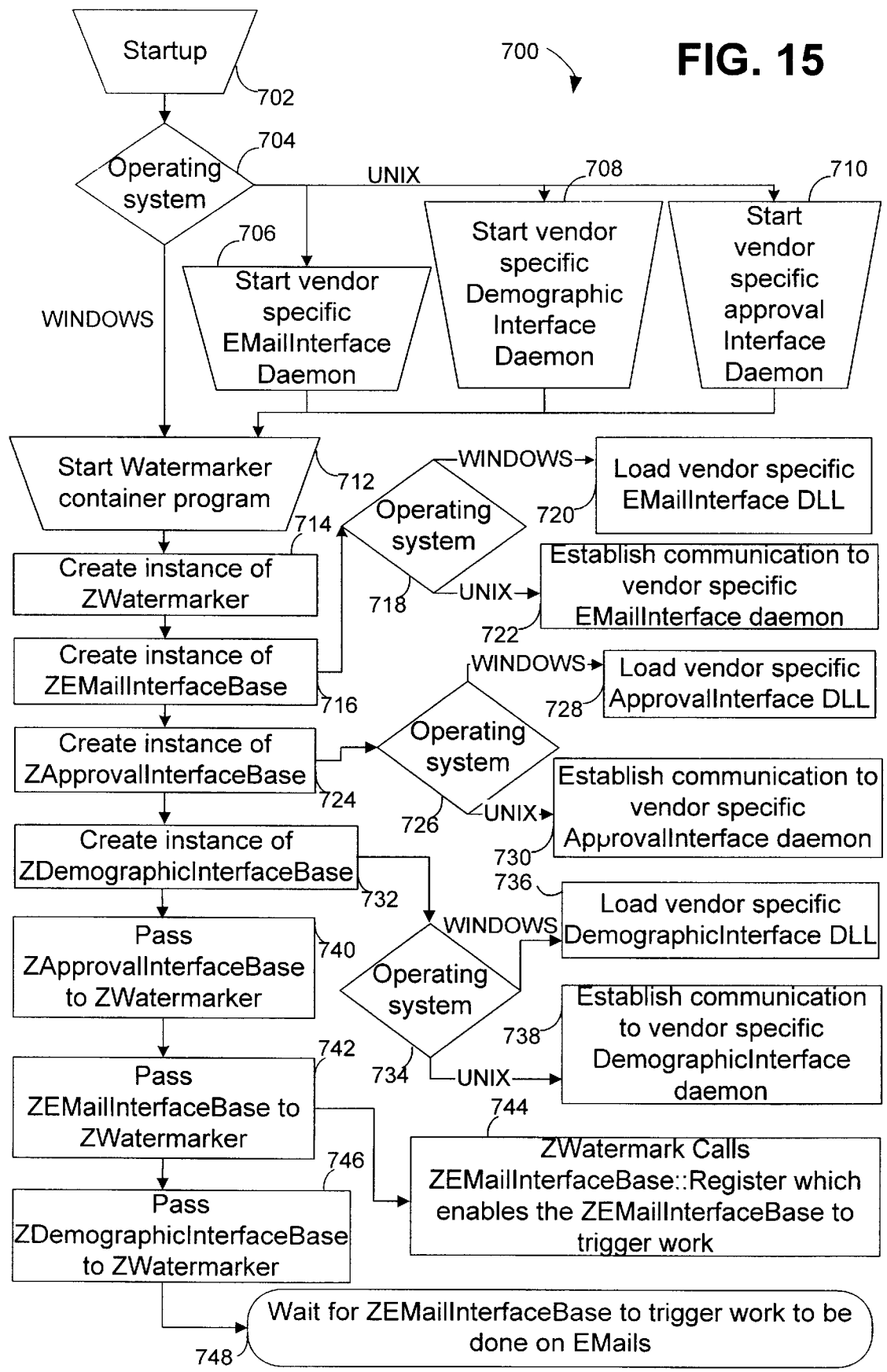
FIG. 15 is a flowchart showing a configuration process of the advertising system implementation portion represented by FIG. 14.

Refer also to FIG. 15, which is a flowchart showing a configuration process 700 of the advertising system implementation portion represented by FIG. 14. When configuration process 700 software is compiled, a determination is made regarding the operating system environment, such as Windows or Unix. After that determination is made, the compiled software runs according to the operating system distinctions shown, but the determination is made only once. Thus, after it is determined that Unix or Windows is the operating environment for a particular implementation, all of the illustrated operating system determinations 704, 718, 726, and 734 are already determined. After the process 700 starts in step 702, a manual process, if Unix is the operating system, three daemons are manually started in steps 706, 708, and 710, including a vendor specific email interface daemon, a vendor specific demographic interface daemon, and a vendor specific approval interface daemon, respectively.

Subsequently, a watermarker container program is manually started in step 712. The watermarker container program then instantiates, creates an instance of, ZWatermarker 628 in step 714. Subsequently, in step 716, the watermarker container program creates an instance of the ZEMailInterfaceBase 612, after which either a vendor specific EMailInterface DLL is loaded (step 720) or communication is established to a vendor specific EMailInterface daemon (step 722), depending on the operating system in which the process 700 software is compiled, as discussed above. Then, in step 724, the watermarker container program creates an instance of the ZApprovalInterfaceBase 620, after which either a vendor specific ApprovalInterface DLL is loaded (step 728) or communication is established to a vendor specific ApprovalInterface daemon (step 730), depending on the operating system in which the process 700 software is compiled, as discussed above. In step 732, the watermarker container program creates an instance of the ZDemographicInterfaceBase 616, after which either a vendor specific DemographicInterface DLL is loaded (step 736) or communication is established to a vendor specific DemographicInterface daemon (step 738), depending on the operating system in which the process 700 software is compiled, as discussed above.

The watermarker container program then passes the ZApprovalInterfaceBase 620 to the ZWatermarker 628 in step 740, which calls the PutApprovalInterface method in the ZWatermarker 628. The watermarker container program passes the ZEMailInterfaceBase 612 to the ZWatermarker 628 in step 742, which calls the PutEMailInterface method in the ZWatermarker 628, which then prompts the ZWatermarker 628, in step 744, to call ZEMailInterfaceBase::Register to enable the ZEMailInterfaceBase 612 to trigger work. In step 746, the watermarker container program passes the ZDemographicInterfaceBase 616 to the ZWatermarker 628, which calls the PutDemographicInterface method in the ZWatermarker 628. Although the watermarker container program is then finished initializing, the process 700 waits in step 748 for the ZEMailInterfaceBase 612 to trigger work in response to receiving an e-mail message as discussed below.

Refer also to FIG. 16, which is a flowchart showing selected e-mail processing steps 800 of the advertising system implementation portion represented by FIG. 14. After an e-mail message is received in step 802, through the ZVendorSpecificEmailInterface 610, the ZEMailInterfaceBase 612 calls, in step 804, the ZWatermarker::ProcessEmail method in the ZWatermarker 628 with an EMail reference ID (identification number). Step 802 may include being notified by an external brand-specific e-mail server program through the ZVendorSpecificEmailInterface 610 that a new e-mail message is in a particular mailbox. In other embodiments, the ZVendorSpecificEmailInterface 610 polls the external e-mail server program to determine when a new e-mail message is available. When the ZWatermarker 628 is available in step 806, it retrieves the email message from the ZEMailInterfaceBase 612 as a ZEMailBase 624 object using the previously supplied reference ID. The ZEMailBase 624 is a data container that parses the received e-mail message so that the ZWatermarker 628 can operate on e-mail messages regardless of format. Subsequently, in step 808, the ZWatermarker 628 passes the ZEMailBase 624 object to the ZApprovalInterfaceBase:IsApproved method of the ZApprovalInterfaceBase 620, which examines the ZEMailBase 624 object to determine if further processing is necessary, as determined by a separate approval system with which the ZVendorSpecificApprovalInterface 618 interfaces. As discussed above, this separate approval system functions in accordance with an approval configuration for each end user recipient which, in some embodiments, determines if an existing background reference exists and if it is to be overwritten. In other embodiments, certain users may be configured to have all background references overwritten, and in other embodiments, the insertion of background references is approved based on other demographic or message content factors. As determined in decision step 810, if the ZApprovalInterfaceBase:IsApproved method returns false, the process 800 essentially terminates and waits for another incoming e-mail message in step 812. Otherwise, processing continues in step 814.

In step 814, the ZWatermarker 628 retrieves the MailBoxName from the ZEMailBase 624 object. Subsequently, in step 816, the ZWatermarker 628 begins the process of obtaining an appropriate background reference by calling the ZDemographicInterfaceBase::GetBackgroundReference method of the ZDemographicInterfaceBase 616 and supplying the MailBoxName. Then, in step 818, separate demographic software, to which an interface is provided through ZVendorSpecificDemographicInterface 614, determines the appropriate background reference for the supplied MailBoxName. In step 820, the ZWatermarker 628 converts the ZEMailBase 624 object to a ZHTMLEMail 622 object with a provided copy constructor. Since the ZHTMLEMail 622 inherits from the ZEMailBase 624, the ZHTMLEMail 622 has access to all of the data and structure of the ZHTMLEMail 622 object for making an HTML copy. As discussed above, conversion to HTML includes a complete conversion for web-based applications, and conversion of a portion of the e-mail message for non-web-based applications. In addition, attachments are also handled at this point as discussed above, as well as the creation of control buttons for general control and for downloading any attachments through server scripting in web-based applications. Then, in step 822, the ZWatermarker 628 calls the ZHTMLEMail::AddBackground method of the ZHTMLEMail 622 with the appropriate background reference, which is inserted into the HTML of the ZHTMLEMail 622 object. In step 824, the ZWatermarker 628 returns the newly formatted ZHTMLEMail to the ZEMailInterfaceBase by calling the PutEmail method, which includes placing the ZHTMLEMail 622 object in an appropriate place for making the message available for delivery to an end user recipient. Subsequently, the process 800 waits for the next e-mail message in step 812.

In other embodiments of the present invention, the RecipientList and CarbonCopyList variables of the ZEMailBase 624 object for each e-mail message are used to generate associational demographic information. In other words, marketing conclusions can be drawn about other primary recipients and carbon copy recipients based on demographic information of one intended end user recipient. Thus, this information is useful and easily tracked and reported in accordance with the present invention.

In concluding the detailed description, it should be noted that it will be obvious to those skilled in the art that many variations and modifications can be made to the preferred embodiment without substantially departing from the principles of the present invention. All such variations and modifications are intended to be included herein within the scope of the present invention, as set forth in the following claims.

We claim:

1. An advertising method for inserting a background reference to a stored advertisement into an end user communication message in a communications network, said method comprising the steps of:

receiving an end user communication message at a first site on a communications network;

inserting into said end user communication message a background reference to a stored advertisement, wherein said inserting step includes:

determining whether said end user communication message is in a format capable of operatively accepting said background reference, and converting said end user communication message into a format capable of operatively accepting said background reference responsive to determining that said message is not in a format capable of operatively accepting said background reference; and transmitting said end user communication message with said background reference to a second site on the communications network.

2. The method as claimed in claim 1, wherein said background reference is operative for enabling background tiling of said advertisement at said second site.

3. The method as claimed in claim 1, wherein said end user communication message includes an Internet e-mail message.

4. The method as claimed in claim 1, wherein said end user communication message includes a public posting.

5. The method as claimed in claim 1, further comprising a step of transforming said end user communication message into hypertext markup language (HTML), and wherein said transmitting step includes transmitting said end user communication message in a web-based e-mail system to a web browser at said second site.

6. The method as claimed in claim 1, wherein said transmitting step includes transmitting said end user communication message in a post office protocol (POP) format.

7. The method as claimed in claim 1, wherein said inserting step includes selecting the stored advertisement based on user demographic information.

8. The method as claimed in claim 1, wherein said inserting step includes selecting the stored advertisement based on advertisement exposure for a pool of advertisers.

9. The method as claimed in claim 1, wherein said inserting step includes inserting a hypertext markup language (HTML) background reference tag into the end user communication message.

10. The method as claimed in claim 1, wherein said stored advertisement is stored at the first site.

11. The method as claimed in claim 1, wherein said stored advertisement is stored at a site remote from said second site, wherein said background reference includes a file address remote from said second site.

12. The method as claimed in claim 1, wherein said stored advertisement is a graphical image file.

13. The method as claimed in claim 1, wherein said determining step includes a step of determining whether said end user communication message is in multipurpose Internet mail extensions (MIME) format.

14. The method as claimed in claim 1, wherein said converting step includes a step of converting said end user communication message into multipurpose Internet mail extensions (MIME) format.

15. The method as claimed in claim 14, further comprising a step of adding an SGML part to said end user communication message converted into MIME format.

16. The method as claimed in claim 15, wherein said SGML part includes hypertext markup language (HTML).

17. The method as claimed in claim 1, further comprising the steps of identifying and recording all intended recipients of the end user communication message and forming associational demographic relationships.

18. An advertising method for inserting a background reference to a stored advertisement into an end user communication message in a communications network, said method comprising the steps of:

receiving an end user communication message at a first site on a communications network;

first determining whether said end user communication message in said receiving step is in a format capable of operatively accepting a background reference;

second determining whether said end user communication message contains a standard generalized markup language (SGML) part responsive to determining that said end user communication message is in a format capable of operatively accepting a background reference in said first determining step;

adding an SGML part to said end user communication message responsive to determining that said end user communication message does not contain an SGML part;

inserting into said end user communication message a background reference to a stored advertisement; and transmitting said end user communication message with said background reference to a second site on the communications network.

19. The method as claimed in claim 18, wherein said SGML part includes hypertext markup language (HTML).

20. The method as claimed in claim 18, further comprising the steps of:
   third determining whether said end user communication message already contains a background reference responsive to determining that said end user communication message is in a format capable of operatively accepting a background reference in said second determining step; and
   inserting a background reference responsive to determining that said end user communication message does not contain a background reference in said third determining step.

21. The method as claimed in claim 20, further comprising the steps of:
   fourth determining whether a configuration enables an existing background reference to be overwritten responsive to determining in said third determining step that said end user communication message already contains a background reference; and
   overwriting a background reference responsive to determining in said fourth determining step that the configuration enables the existing background reference to be overwritten.

22. An advertising system for placing an advertisement pointer in a background of an end user communication message, said advertising system comprising:
   means for receiving an end user communication message;
   means for determining whether the end user communication message is in a format capable of operatively accepting an advertisement pointer:
   means for converting the end user communication message into a format capable of operatively accepting an advertisement pointer responsive to determining that the end user communication message is not in a format capable of operatively accepting an advertisement pointer:
   means for placing an advertisement pointer in a background of the end user communication message; and
   means for transmitting the end user communication message with said advertisement pointer.

23. The system as claimed in claim 22, wherein said advertisement pointer includes means for enabling background tiling of said advertisement.

24. The system as claimed in claim 22, wherein the end user communication message includes an Internet e-mail message.

25. The system as claimed in claim 22, wherein the end user communication message includes a public posting.

26. The system as claimed in claim 22, further comprising means for transforming the end user communication message into hypertext markup language (HTML), and wherein said transmitting means includes means for transmitting the end user communication message in a web-based e-mail system to a web browser.

27. The system as claimed in claim 22, wherein said transmitting means includes means for transmitting the end user communication message in a post office protocol (POP) format.

28. The system as claimed in claim 22, wherein said placing means includes means for selecting a stored advertisement based on user demographic information.

29. The system as claimed in claim 22, wherein said placing means includes means for selecting a stored advertisement based on advertisement exposure for a pool of advertisers.

30. The system as claimed in claim 22, wherein said placing means includes means for inserting a hypertext markup language (HTML) background reference tag into the end user communication message.

31. The system as claimed in claim 22, wherein said advertisement pointer includes an address of a stored advertisement graphic file.

32. The system as claimed in claim 31, wherein said address is a remote address.

33. The system as claimed in claim 22, wherein said converting means further includes:
   means for converting the end user communication message into a multipurpose Internet mail extensions (MIME) format; and
   means for adding a standard generalized markup language (SGML) part into the end user communication message.

34. The system as claimed in claim 35, wherein said SGML part includes hypertext markup language (HTML).

35. An advertising system for placing an advertisement pointer in a background of an end user communication message, said advertising system comprising:
   means for receiving an end user communication message;
   first means for determining whether the end user communication message is in a format capable of operatively accepting an advertisement pointer;
   second means for determining whether the end user communication message already contains an advertisement pointer responsive to determining that the end user communication message is in a format capable of operatively accepting an advertisement pointer;
   means for placing an advertisement pointer in a background of the end user communication message, wherein said means for placing the advertisement pointer in the background of the end user communication message includes means for placing the advertisement pointer in the background of the end user communication message responsive to determining both that the end user communication message is in a format for operatively accepting an advertisement pointer and that the end user communication message does not contain an advertisement pointer; and
   means for transmitting the end user communication message with said advertisement pointer.

36. The system as claimed in claim 35, further comprising:
   third means for determining whether a configuration enables an existing advertisement pointer to be overwritten responsive to determining both that the end user communication message is in a format capable of operatively accepting an advertisement pointer and that the end user communication message already contains an advertisement pointer; and means for inserting an advertisement pointer responsive to determining that the configuration enables the existing advertisement pointer to be overwritten.

37. A computer program embodied on a computer-readable medium for inserting a background reference to a stored advertisement into an end user communication message, said computer program comprising:
   logic configured to receive an end user communication message from a first site;

logic configured to insert a background reference to a stored advertisement into said end user communication message, wherein said logic configured to insert the background reference is further configured to insert said background reference responsive to said end user communication message not already including a background reference; and logic configured to transmit said end user communication message with the background reference to a second site.

38. The computer program as claimed in claim 37, wherein said background reference is operative for enabling background tiling of said advertisement at said second site.

39. The computer program as claimed in claim 37, wherein the end user communication message includes an Internet e-mail message.

40. The computer program as claimed in claim 37, wherein the end user communication message includes a public posting.

41. The computer program as claimed in claim 37, further comprising logic configured to transform the end user communication message into hypertext markup language (HTML), and wherein said logic configured to transmit said end user communication message is further configured to transmit said end user communication message in a web-based e-mail system to a web browser.

42. The computer program as claimed in claim 37, wherein said logic configured to transmit said end user communication message is further configured to transmit sad end user communication message in a post office protocol (POP) format.

43. The computer program as claimed in claim 37, further comprising logic configured to select said background reference based on demographic information.

44. The computer program as claimed in claim 37, further comprising logic configured to select said background reference based on a pool of advertisers.

45. A computer program embodied on a computer-readable medium for inserting a background reference to a stored advertisement into an end user communication message, said computer program comprising:

logic configured to receive an end user communication message from a first site;

logic configured to insert a background reference to a stored advertisement into said end user communication message, wherein said logic configured to insert the background reference is further configured to insert said background reference responsive to an overwrite authorization; and logic configured to transmit said end user communication message with the background reference to a second site.

46. A computer program embodied on a computer-readable medium for inserting a background reference to a stored advertisement into an end user communication message, said computer program comprising:

logic configured to receive an end user communication message from a first site;

logic configured to insert a background reference to a stored advertisement into said end user communication message;

logic configured to determine whether said end user communication message is in a format capable of operatively accepting said background reference;

logic configured to convert said end user communication message into a format capable of operatively accepting said background reference responsive to determining that said end user communication message is not in a format capable of operatively accepting said background reference; and logic configured to transmit said end user communication message with the background reference to a second site.

\* \* \* \* \*